(12) United States Patent
Werner

(10) Patent No.: US 9,792,360 B2
(45) Date of Patent: Oct. 17, 2017

(54) METHOD AND APPARATUS FOR PAIRING MUSIC AND FOOD SELECTIONS

(71) Applicant: Barbara Werner, Stamford, CT (US)

(72) Inventor: Barbara Werner, Stamford, CT (US)

( * ) Notice: Subject to any disclaimer, the term of this patent is extended or adjusted under 35 U.S.C. 154(b) by 225 days.

(21) Appl. No.: 14/526,457

(22) Filed: Oct. 28, 2014

(65) Prior Publication Data

US 2016/0110450 A1 Apr. 21, 2016

Related U.S. Application Data

(63) Continuation-in-part of application No. 14/520,252, filed on Oct. 21, 2014, now abandoned.

(51) Int. Cl.
*G06F 17/30* (2006.01)
*G06Q 50/12* (2012.01)

(52) U.S. Cl.
CPC .. *G06F 17/30752* (2013.01); *G06F 17/30026* (2013.01); *G06F 17/3053* (2013.01); *G06Q 50/12* (2013.01)

(58) Field of Classification Search
CPC ............... G06Q 80/00; G06F 17/3053; G06F 17/30026; G06F 17/30752
(Continued)

(56) References Cited

U.S. PATENT DOCUMENTS 6,301,564 B1 * 10/2001 Halverson ............ G06Q 30/02
705/15
2001/0053945 A1 * 12/2001 Hayashi ............ G06F 17/30017
700/94

(Continued)

OTHER PUBLICATIONS

Werner, Barbara, "Musical Pairing," copyright Jun. 12, 2013 (64 pages).

(Continued)

*Primary Examiner* — Kim Nguyen
*Assistant Examiner* — Tiffany Bui
(74) *Attorney, Agent, or Firm* — McCarter & English, LLP

(57) ABSTRACT

A system and method enable the selection of musical recordings for pairing with a food serving, possibly an appetizer, a main course, a dessert or a beverage, for the purpose of increasing the enjoyment of a given meal. A plurality of factors for specific meal components such as entree, including protein type, method of cooking, amount of spice, side dish component and type of sauce are used to determine a specific numerical value for a meal; appetizer including protein type, bread and dough content, method of cooking and spice level; dessert, including content of cacao, sweetener and content of sweetener, ambient temperature at service and dairy content; and beverage, including but not limited to alcohol content, acidity, body, dryness, lingering quality, and IBU. A specific numerical value for a musical recording is also determined based on a plurality of factors, including genre, tempo, dynamics, and primary instrument. The numerical value assigned to the meal and the numerical value assigned to the musical recording are preferably as nearly identical as possible. The musical recording enhances the perception of the flavor, texture, and overall experience of the food. The process may be facilitated through use of a dedicated mobile application, or may be performed manually by a user.

22 Claims, 22 Drawing Sheets

(58) Field of Classification Search
USPC .......................................................... 707/728
See application file for complete search history.

(56) References Cited

U.S. PATENT DOCUMENTS

| | | | | |
|---|---|---|---|---|
| 2007/0184167 | A1* | 8/2007 | Hurst | A21D 10/002 426/549 |
| 2007/0186753 | A1* | 8/2007 | Bohn | G10H 1/0041 84/609 |
| 2012/0226698 | A1* | 9/2012 | Silvestre | G06Q 30/02 707/741 |
| 2012/0303470 | A1* | 11/2012 | Arsenault | G06Q 10/00 705/15 |
| 2013/0062872 | A1* | 3/2013 | Sheridan | G09F 3/00 283/67 |
| 2014/0095487 | A1* | 4/2014 | Kurz | G06Q 30/0631 707/722 |
| 2015/0036138 | A1* | 2/2015 | Watson | G01N 21/31 356/402 |
| 2015/0199624 | A1* | 7/2015 | Pinel | G06N 7/005 705/348 |
| 2015/0335054 | A1* | 11/2015 | van der Hijden | A23L 1/3081 426/577 |
| 2016/0092936 | A1* | 3/2016 | Bharath | G06Q 30/0276 705/14.66 |
| 2016/0171514 | A1* | 6/2016 | Frank | G06Q 30/0201 705/7.29 |

OTHER PUBLICATIONS

Werner, Barbara, "Musical Pairing, The Art of Harmonizing Music to Your Meal," copyright Jun. 12, 2013 (1 page).
Bartoshuk, Ph.D., Linda M., "The phychophysics of taste," The American Journal of Clinical Nutrition 31: Jun. 1978, pp. 1068-1077 (10 pages).
Philipsen, D.H., et al., "Consumer Age Affects Response to Sensory Characteristics of a Cherry Flavored Beverage," Journal of Food Science, pp. 364-368, vol. 60, No. 2, 1995 (5 pages).
Todrank, Josephine, et al., "A Taste Illusion: Taste Sensation Localized by Touch," Physiology & Behavior, vol. 50, pp. 1027-1031, 1991 (5 pages).
Hsu, Jeremy, "Music-Memory Connection Found in Brain, "Feb. 24, 2009 (3 pages).

\* cited by examiner

MPN

FPN = MPN

APP.FPN = MPN

DPN = MPN

BPN based solely on Base Recommendation
No Other User Input

Detailed BPN
Non Alcoholic Beverages

Detailed BPN Wine Alcoholic Beverages

General BPN
Spirits Neat

Detailed BPN
Cocktail
Alcoholic Beverages

Detailed BPN Beer

| MPN.ID.001 | MPN.001 | M.ID.001 |
| M.REC.ID.001 | | |

| MPN.ID.002 | MPN.002 | M.ID.002 |
| M.REC.ID.002 | | |

| MPN.ID.003 | MPN.003 | M.ID.003 |
| M.REC.ID.003 | | |

| MPN.ID.N | MPN.N | M.ID.N |
| M.REC.ID.N | | |

**FIGURE 13B
MUSIC PAIRING NUMBER
LIBRARY 110I**

OFF-DEVICE STORAGE OF MUSICAL RECORDINGS

PAIRING DEVICE PROCESS

PAIRING DEVICE PROCESS

REMOTE SERVER PROCESS

PAIRING DEVICE PROCESS

M.REC REQUEST MESSAGE

M.REC XMIT MESSAGE

US 9,792,360 B2

METHOD AND APPARATUS FOR PAIRING MUSIC AND FOOD SELECTIONS

This Nonprovisional Patent Application is a Continuation-in-Part Application to Nonprovisional patent application Ser. No. 14/520,252 filed on Oct. 21, 2014 by inventor Barbara Werner and titled "METHOD AND APPARATUS FOR PAIRING MUSIC AND FOOD SELECTIONS". Nonprovisional patent application Ser. No. 14/520,252 is hereby incorporated by reference in its entirety and for all purposes, to include claiming benefit of the priority date of filing of Nonprovisional patent application Ser. No. 14/520,252

FIELD OF THE INVENTION

The present invention relates to the relatedness of one or more meals with one or more musical recordings. More particularly, the invented method relates to associating musical recordings with specific foods by means of a system of numerical values, for the purpose of optimizing the dining experience.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Previous methods of determining musical accompaniment to dining experiences do not sufficiently take into account a potential relationship between simultaneous auditory and gustatory experiences. The musical choices made on the part of, for example, restaurant owners and managers often do not encompass the entirety of the dining experience. A restaurant owner or manager may be inadvertently discouraging repeat customers through use of musical recordings that are discordant with the food. For example, musical recordings based solely upon the regional specialty of a restaurant may provide a subconscious clash with the majority of the dishes served in that restaurant, which occurrence may lead to a long-term pecuniary loss for the restaurant in question.

There is therefore a long-felt need to provide a method and system that provide increased efficiencies of relating musical recordings and dining.

SUMMARY AND OBJECTS OF THE INVENTION

Towards these objects and other objects that will be made obvious in light of the present disclosure, a system and method are provided that enable the selection of musical recordings to complement a designated dining experience. The specifically selected numerical values of the method of the present invention (hereinafter, "the invented method") are used to designate a value assigned to a musical selection, which value will preferably approach or be identical to a designated numerical value assigned to a meal. The assignment of numerical value to both a musical selection and to a meal allows for a more ideal dining experience, wherein the musical selection is exactly suited to the flavors and textures of the meal being consumed.

In a further embodiment of the invented method, a numerical value assigned to the food to be consumed is summed from or derived by certain identifier(s) or aspects of the serving. In certain alternate preferred embodiments of the invented method, a user designates a protein type, to which a specific numerical value is assigned. To the protein value, the user adds the predetermined numerical value assigned to the sauce type. A further predetermined numerical value is added according to the spiciness and/or saltiness of the dish. A final predetermined numerical value is added according to the method of preparation. The protein value, a saltiness value, a capsaicin concentration value, a spiciness value, a sauce type value and/or a food preparation value may be summed to generate a food pairing number value In an optional additional embodiment of the invented method, the side dish may also be assigned a numerical value.

In certain other alternate preferred embodiments of the invented method, a dessert pairing number is derived from a cacao content value, a sugar content value, a serving temperature value, and/or a dairy content value.

In certain still other alternate preferred embodiments of the invented method, a beverage pairing number is summed with or derived from one or more beverage parameters, such as a wine type value number which is derived from an alcohol content value, a wine type value, a hard alcohol/spirits value, a cocktail value, and a beer value, wherein one or more beverage parameters is a null value.

In a yet further embodiment of the invented method, the user subsequently employs the invented method to designate a musical recording with a numerical value identical to the previously determined numerical value of the dish. To determine the numerical value of the musical recording, the user first identifies a family genre of music from which to choose the recording. To the family genre number, the user adds a predetermined value based on the tempo of the recording. A further predetermined value is added to the total value of the sum of the genre and the tempo based upon the primary instrument to be heard in the recording. A final predetermined value is added to total based upon the dynamics of the recording.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

These, and further features of the invention, may be better understood with reference to the accompanying specification and drawings depicting the preferred embodiment, in which:

FIG. 13B is a block diagram of the music pairing number library of FIG. 11;

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
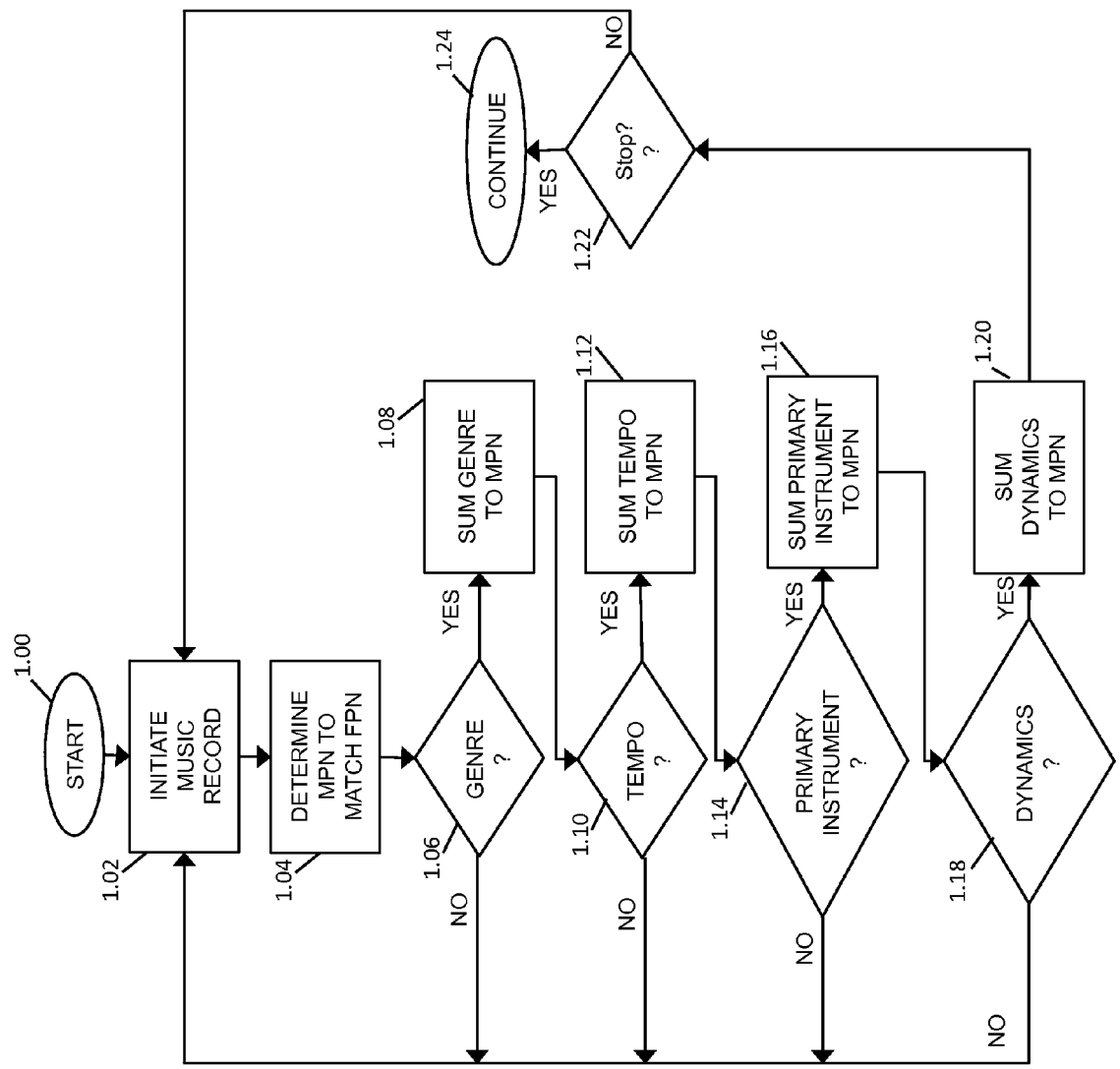
FIG. 1 is a flowchart representing an aspect of the invented method whereby a pairing device generates a musical pairing number.

Referring now generally to the Figures and particularly to FIG. 1, FIG. 1 is a flowchart of certain aspects of the invented method relating to the generation and designation of a first musical pairing number value MPN.001. The pairing device 110 first sets the musical pairing number MPN.001 to 0. In step 1.02 the pairing device 110 initiates a first music record M.REC.001. In step 1.04 the pairing device 110 determines a musical pairing number value MPN.001 to match a previously determined food pairing number value FPN.001. In step 1.06 the pairing device 110 determines a genre GEN.001 of music from which to choose musical accompaniment. The genre GEN.001 may be selected from a plurality of genres GEN.001-GEN.N including but not limited to classical, jazz, country, rock, or alternative. Each of the above-listed genres GEN.001-GEN.N represents a pre-determined numerical value which may be summed with other aspects of the musical pairing number MPN.001 to determine a final musical pairing number MPN.001, which may be paired with a food pairing number FPN.001. The numerical values associated with the genre GEN.001-GEN.N may range from 0 through 4. Jazz is associated with the numerical values 0 or 1; country music is associated with the numerical values 1 or 2; rock and roll is associated with the numerical values 2 or 3; and classical music is associated with the numerical values of 3 or 4. In step 1.08 the pairing device 110 sums the genre to the musical pairing number MPN.001. If no genre may be determined upon by the pairing device 110, the pairing device 110 proceeds back to step 1.02 and initiates a new music record M.REC.N.

In step 1.10 the pairing device 110 determines a desired tempo TEMP.001 for music record M.REC.001. The tempo TEMP.001 may optionally be chosen from a spectrum which has as extremes "very fast" and "extremely slow;" all choices within the spectrum of tempo carries a designated numerical value. The numerical values associated with the tempo TEMP.001-TEMP.N range from 0 through 4; the value assigned to a designated to a specified musical record M.REC.001 is inversely related to the tempo TEMP.001-TEMP.N of the musical record M.REC.001. A "very fast tempo" is associated with the numerical value of 0; a "fairly quick tempo" is associated with the numerical value of 1; a "fairly slow tempo" is associated with a numerical value of 2; a "very slow tempo" is associated with a numerical value of 3; and an "extremely slow tempo" is associated with a numerical value of 4. The designated numerical value of the tempo TEMP.001 is summed with the total musical pairing number MPN.001 in step 1.12. If the pairing device 110 does not determine, in step 1.10, a tempo TEMP.001 for assignment to the musical pairing number MPN.001, the pairing device 110 returns to step 1.02 and initiates a new music record M.REC.N.

In step 1.14 the pairing device 110 determines the primary instrument PR.IN.001 to be found in the musical record M.REC.001. The primary instrument may optionally be chosen from a plurality of instrument families, including but not limited to stringed instruments, woodwind instruments, brass instruments, percussion instruments, and/or vocals. Each of these instrument families carries pre-determined designated numerical value. The instrument families may be further subdivided into individual instruments; the stringed instrument family, for example, may be subdivided into instruments including, but not limited to a violin, a guitar, a cello, and/or a double bass. The strings instrument family ranges between the numerical values of 1 and 4; the woodwind instrument family ranges between the numerical values of 2 and 5; the brass instrument family ranges between the numerical values of 3 and 6; the percussion family ranges between the numerical values of 4 and 7; and the vocal family ranges between the numerical values of 0 and 5. When the pairing device 110 determines a primary instrument PR.IN.001 in step 1.14 the pairing device 110 sums the numerical value of the primary instrument PR.IN.001 to the musical pairing number MPN.001 in step 1.16. If the pairing device 110 does not determine a primary instrument PR.IN.001 in step 1.14, the pairing device 110 returns to step 1.02 and initiates a new music record M.REC.N.

When the pairing device 110 has summed the primary instrument PR.IN.001 to the musical pairing number MPN.001 in step 1.16, the pairing device 110 proceeds to step 1.18. In step 1.18 the pairing device 110 determines the musical dynamics DYN.001 of musical record M.REC.001. The musical dynamics DYN.001 may be selected from a spectrum of types of dynamics ranging from "not dynamic" through "very high dynamic." Each selection on the spectrum of dynamics carries a designated numerical value. A musical recording that is "not dynamic," void of fortissimo or crescendo, is associated with the numerical value of 0; a musical recording that presents a "light steady dynamic," also referred to as pianissimo, is associated with the numerical value of 1; a musical recording that presents a "moderate dynamic," also referred to as mezzopiano, is associated with the numerical value of 2; a musical recording that presents a "high dynamic," also referred to as mezzoforte, is associated with the numerical value of 3; and a musical recording that presents a "very high dynamic," also referred to as fortissimo with multiple crescendo, is associated with the numerical value of 4. When the pairing device 110 determines the musical dynamics DYN.001 the pairing device 110 sums the numerical value assigned to the designated musical dynamics DYN.001 to the musical pairing number MPN.001 in step 1.20. If the pairing device 110 does not determine musical dynamics DYN.001 in step 1.18, the pairing device 110 returns to step 1.02 and initiates a new music record M.REC.001.

The pairing device 110 subsequently advances to step 1.22, wherein the pairing device 110 determines whether to terminate the process. When the determination in step 1.22 is positive, i.e. the pairing device 110 determines to terminate the process, the pairing device 110 advances to step 1.24, wherein the pairing device 110 continues to alternate processes. When the determination in step 1.22 is negative, the pairing device 110 returns to step 1.02 and executes the loop of steps 1.02 through 1.22 as necessary.

The method of FIG. 1 may be better understood by means of the equation $$MPN = GEN + TEMP + PR.IN + DYN$$

wherein MPN represents a numerical value associated with the musical pairing number, GEN represents a numerical value associated with the genre, TEMP represents a numerical value associated with the tempo, PR.IN represents a numerical value associated with the primary instrument and DYN represents a numerical value associated with the dynamics.

Figure 2:
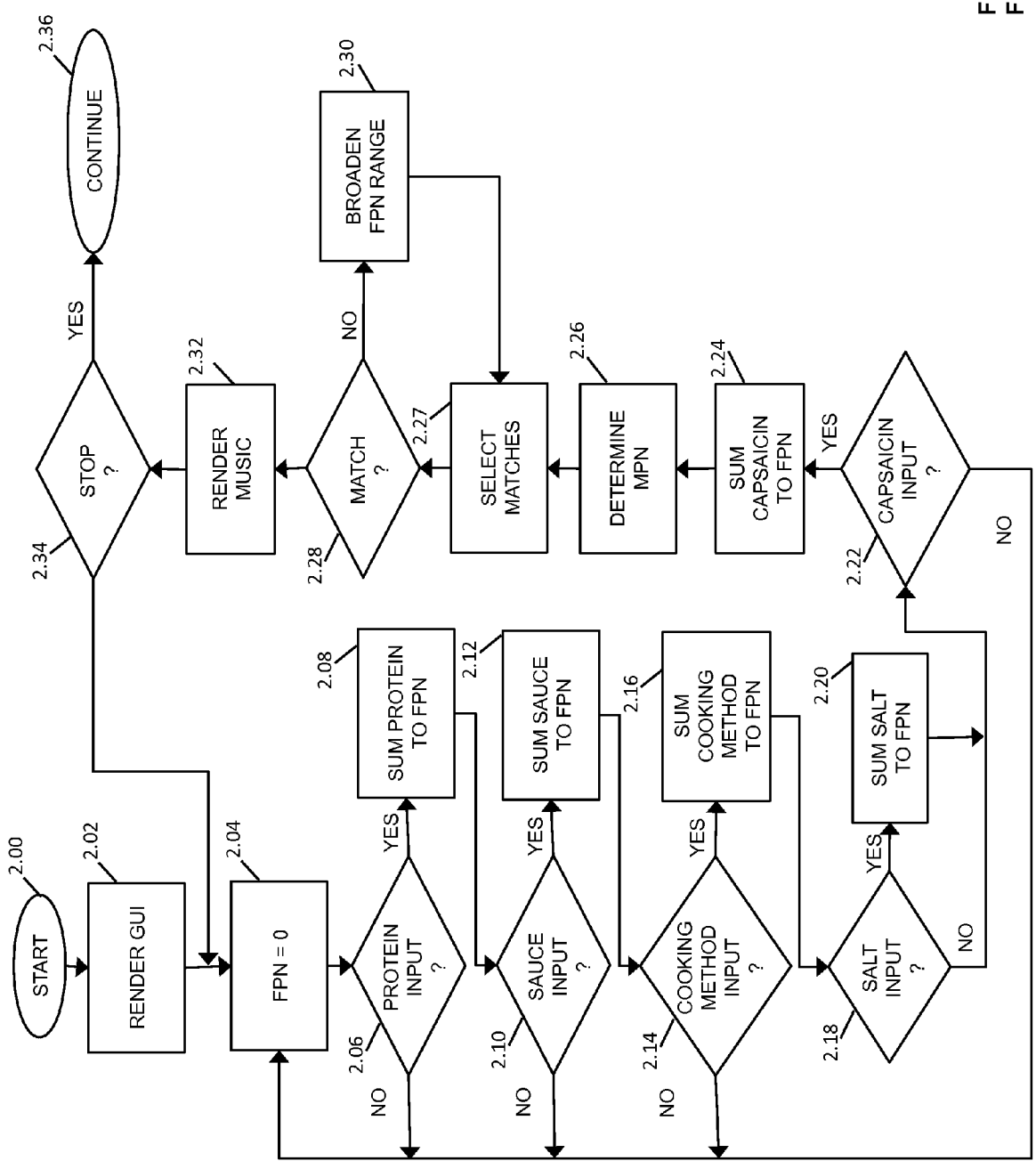
FIG. 2 is a flowchart of a further aspect of the invented method whereby the pairing device generates a food pairing number and associates the food pairing number with a designated musical pairing number.

Referring now generally to the Figures and particularly to FIG. 2, FIG. 2 is a flowchart of a further aspect of the invented method whereby the pairing device 110 generates a food pairing number FPN.001 and pairs the food pairing number FPN.001 with the MPN.001 generated in the method of FIG. 1. In step 2.02 the pairing device 110 renders a graphic user interface GUI.001 for the purpose of allowing a user to view and input data. In step 2.04 the pairing device 110 sets the food pairing number FPN.001 to zero. In step 2.06 the pairing device 110 determines whether a protein type PROT.001 has been input. The protein type PROT.001 may optionally be chosen from a plurality of protein types, including but not limited to tofu, legumes, fish, chicken, eggs, pork, beef, lamb and/or game. Each type of protein is designated with a previously determined numerical value, which may be added to the food pairing number FPN.001. The numerical values associated with the primary ingredient in a designated food selection ranges between 1 and 5: the numerical value associated with fish, legumes and tofu is 1; the numerical value associated with shellfish, chicken or eggs is 2; the numerical value associated with pork is 3; the numerical value associated with beef is 4; and the numerical value associated with lamb, game and organ meats is 5. When the pairing device 110 determines a protein type PROT.001 in step 2.06, the pairing device 110 advances to step 2.08. In step 2.08 the pairing device 110 sums the numerical value associated with the protein type PROT.001 to the food pairing number FPN.001. When the determination in step 2.06 is negative, the pairing device 110 returns to step 2.04 and resets the FPN.N to 0.

When the pairing device 110 has completed the execution of step 2.08, the pairing device 110 advances to step 2.10. In step 2.10 the pairing device 110 determines whether a sauce type SCT.001 has been inputted. The sauce type may optionally be selected from a plurality of sauce families, including, but not limited to béchamel, veloute, espagnole, hollandaise and/or tomate. Each sauce family is assigned a previously determined numerical value. Each sauce family may optionally be further subdivided based upon additional ingredients, which further subdivision alters the previously determined numerical value. The numerical values associated with the sauce type SCT.001 range between 1 and 5; it is understood that additional ingredients may be included in the following sauce types which will alter the sauces' assigned numerical values. The sauce family béchamel is associated with a numerical value of 1; the sauce family velouté is associated with the numerical value of 2; the sauce family espagnole is associated with the numerical value of 3; the sauce family hollandaise is associated with the numerical value of 4; and the sauce family tomate is associated with the numerical value of 5. When the pairing device 110 determines the sauce type SCT.001, the pairing device 110 advances to step 2.12, wherein the numerical value of the sauce type SCT.001 is summed with the food pairing number FPN.001. If the pairing device 110 does not determine at sauce type SCT.001 in step 2.10, the pairing device 110 returns to step 2.04 and resets the food pairing number FPN.001 to 0.

The pairing device 110 subsequently proceeds to step 2.14, wherein the pairing device 110 determines whether a cooking method CKM.001 has been inputted. The cooking method CKM.001 may optionally be determined based upon a plurality of cooking methods CKM.001-CKM.N including, but not limited to, poaching, boiling, grilling, broiling, baking, sautéing, and/or frying. To each of these cooking methods CKM.001-CKM.N is assigned a numerical value, which may be added to the food pairing number FPN.001. The cooking method CKM.001 is associated with values ranging between 1 and 5. Poaching or boiling is associated with the numerical value of 1; grilling or broiling is associated with the numerical value of 2; baking is associated with the numerical value of 3; sautéing is associated with a numerical value of 4; frying with the numerical value of 5. When the pairing device 110 has assigned the numerical value associated with the cooking method CKM.001 in step 2.14, the pairing device 110 advances to step 2.16. In step 2.16 the pairing device 110 sums the numerical value associated with the cooking method CKM.001 and the food pairing number FPN.001. If no cooking method may be assigned to the designated food selection, i.e. if the determination in step 2.14 is negative, the pairing device 110 returns to step 2.04 and resets the FPN.N to 0.

Steps 2.18 through 2.24 may best concern the determination of the "spiciness" of the food selection. In the context of the invented method, the "spiciness" of the food selection comprises the level of salt in the food selection and the capsaicin content therein. In step 2.18 the pairing device 110 determines whether a salt level SLT.001 has been inputted. If the pairing device 110 determines that a salt level SLT.001 has been inputted the pairing device 110 advances to step 2.20. In step 2.20 the pairing device 110 sums the salt level SLT.001 to the food pairing number FPN.001. In the alternative, when the pairing device 110 does not receive a salt level SLT.001 input in step 2.18, or when the salt level SLT.001 has been summed with the food pairing number FPN.001 in step 2.20, the pairing device 110 advances to step 2.22. In step 2.22 the pairing device 110 determines the capsaicin content CSC.001 of the food selection. The capsaicin content CSC.001 may optionally be determined based upon a sliding scale of "no discernible spice" through "extremely spicy." Each of the optional spaces on the capsaicin content CSC.001 sliding scale is assigned a previously determined numerical value. When the pairing device 110 in step 2.22 determines the capsaicin content CSC.001 numerical value, the capsaicin content CSC.001 numerical value is added to the food pairing number FPN.001 by the pairing device 110 in step 2.24. If the pairing device 110 does not detect a capsaicin content CSC.001, the pairing device 110 returns to step 2.04 and returns the FPN.001 to 0.

In step 2.26 the pairing device 110 generates a musical pairing number MPN.001 through the method of FIG. 1 that is as identical as possible to the food pairing number FPN.001 determined in steps 2.06 through 2.24. In step 2.27 the pairing device 110 selects musical records M.REC.001-M.REC.N having a musical pairing number MPN.001-MPN.N which approaches or is identical to the food pairing number FPN.001. In step 2.28 the pairing device 110 determines whether the musical pairing number MPN.001 and the food pairing number FPN.001 match. If the pairing device 110 determines in step 2.28 that the food pairing number FPN.001 and the musical pairing number MPN.001 do not match closely enough, the pairing device 110 advances to step 2.30, wherein the food pairing number FPN.001 is broadened. The pairing device 110 subsequently repeats the loop of steps 2.27 through 2.28 until the determination in step 2.28 is positive. When the determination in step 2.28 is positive the pairing device 110 advances to step 2.32, wherein the pairing device 110 renders the musical record M.REC.001. The pairing device 110 then proceeds to step 2.34, wherein the pairing device 110 determines whether to terminate the process. When the determination in step 2.34 is positive, the pairing device 110 proceeds to step 2.36, wherein alternate processes are executed. When the determination in step 2.34 is negative, the pairing device 110 returns to step 2.04 and re-executes the loop of steps 2.04 through 2.34 as necessary.

The method of FIG. 2 may be more clearly comprehended by means of the equation

FPN=PROT+SCT++CKM+CSC where FPN represents the numerical value associated with the food pairing number, PROT represents the numerical value associated with the primary ingredient (usually a protein) in a designated food selection, SCT represents the numerical value associated with the type of sauce used in the designated food selection, CKM represents the numerical value associated with the way in which the food was prepared, and CSC represents the numerical value associated with the level of spice in the dish (this incorporates both the level of salt and the capsaicin concentration present in the food selection).

Figure 3:
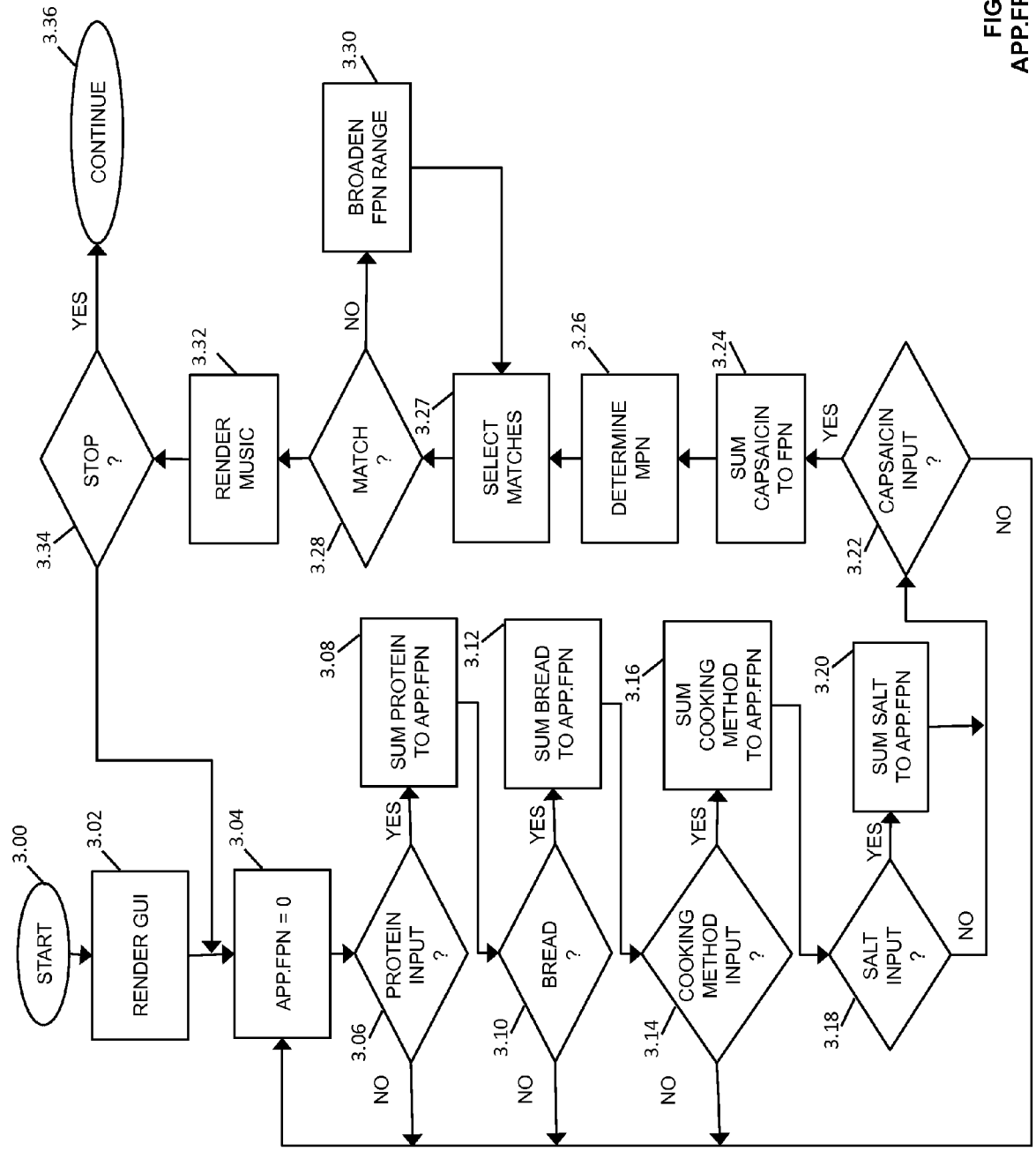
FIG. 3 is a flowchart of a yet further aspect of the invented method whereby the pairing device generates a appetizer food pairing number and associates the appetizer food pairing number with a designated musical pairing number.

Referring now generally to the Figures and particularly to FIG. 3, FIG. 3 is a flowchart of a further aspect of the invented method whereby the pairing device 110 generates a food pairing number FPN.001 and pairs the food pairing number FPN.001 with the MPN.001 generated in the method of FIG. 1. In step 3.02 the pairing device 110 renders a graphic user interface GUI.001 for the purpose of allowing a user to view and input data. In step 3.04 the pairing device 110 sets the appetizer food pairing number APP.FPN.001 to zero. In step 3.06 the pairing device 110 determines whether an appetizer protein type AP.PROT.001 has been input. The appetizer protein type APP.PROT.001 may optionally be chosen from a plurality of protein types, including but not limited to tofu, legumes, fish, chicken, eggs, pork, beef, lamb and/or game. Each type of protein is designated with a previously determined numerical value, which may be added to the appetizer food pairing number APP.FPN.001. The numerical values associated with the primary ingredient in a designated food selection ranges between 1 and 5: the numerical value associated with fish, legumes and tofu is 1; the numerical value associated with shellfish, chicken or eggs is 2; the numerical value associated with pork is 3; the numerical value associated with beef is 4; and the numerical value associated with lamb, game and organ meats is 5. When the pairing device 110 determines an appetizer protein type APP.PROT.001 in step 3.06, the pairing device 110 advances to step 3.08. In step 3.08 the pairing device 110 sums the numerical value associated with the appetizer protein type APP.PROT.001 to the appetizer food pairing number APP.FPN.001. When the determination in step 3.06 is negative, the pairing device 110 returns to step 3.04 and resets the APP.FPN.001 to 0.

When the pairing device 110 has completed the execution of step 3.08, the pairing device 110 advances to step 3.10. In step 3.10 the pairing device 110 determines whether a bread designation APP.BRD.001 has been inputted. The bread designation may optionally be selected from a plurality of bread types, including, but not limited to whole wheat, dark bread, white bread, and/or sourdough. Each bread type is assigned a previously determined numerical value. The numerical values associated with the bread designation APP.BRD.001 range between 1 and 5. When the pairing device 110 determines the bread designation APP.BRD.001, the pairing device 110 advances to step 3.12, wherein the numerical value of the bread designation APP.BRD.001 is summed with the appetizer food pairing number APP.FPN.001. If the pairing device 110 does not determine a bread designation APP.BRD.001 in step 3.10, the pairing device 110 returns to step 3.04 and resets the appetizer food pairing number APP.FPN.001 to 0.

The pairing device 110 subsequently proceeds to step 3.14, wherein the pairing device 110 determines whether an appetizer cooking method APP.CKM.001 has been inputted. The appetizer cooking method APP.CKM.001 may optionally be determined based upon a plurality of appetizer cooking methods APP.CKM.001-APP.CKM.N including, but not limited to, poaching, boiling, grilling, broiling, baking, sautéing, and/or frying. To each of these appetizer cooking methods APP.CKM.001-APP.CKM.N is assigned a numerical value, which may be added to the appetizer food pairing number APP.FPN.001. The appetizer cooking method APP.CKM.001 is associated with values ranging between 1 and 5. Poaching or boiling is associated with the numerical value of 1; grilling or broiling is associated with the numerical value of 2; baking is associated with the numerical value of 3; sautéing is associated with a numerical value of 4; frying with the numerical value of 5. When the pairing device 110 has assigned the numerical value associated with the appetizer cooking method APP.CKM.001 in step 3.14, the pairing device 110 advances to step 3.16. In step 3.16 the pairing device 110 sums the numerical value associated with the appetizer cooking method APP.CKM.001 and the appetizer food pairing number APP.FPN.001. If no cooking method may be assigned to the designated food selection, i.e. if the determination in step 3.14 is negative, the pairing device 110 returns to step 3.04 and resets the APP.FPN.N to 0.

Steps 3.18 through 3.24 may best concern the determination of the "spiciness" of the appetizer selection. In the context of the invented method, the "spiciness" of the appetizer selection comprises the level of salt in the food selection and the capsaicin content therein. In step 3.18 the pairing device 110 determines whether an appetizer salt level APP.SLT.001 has been inputted. If the pairing device 110 determines that an appetizer salt level APP.SLT.001 has been inputted the pairing device 110 advances to step 3.20. In step 3.20 the pairing device 110 sums the appetizer salt level APP.SLT.001 to the appetizer food pairing number APP.FPN.001. In the alternative, when the pairing device 110 does not receive an appetizer salt level APP.SLT.001 input in step 3.18, or when the appetizer salt level APP.SLT.001 has been summed with the appetizer food pairing number APP.FPN.001 in step 3.20, the pairing device 110 advances to step 3.22. In step 3.22 the pairing device 110 determines the appetizer capsaicin content APP.CSC.001 of the food selection. The appetizer capsaicin content APP.CSC.001 may optionally be determined based upon a sliding scale of "no discernible spice" through "extremely spicy." Each of the optional spaces on the appetizer capsaicin content APP.CSC.001 sliding scale is assigned a previously determined numerical value. When the pairing device 110 in step 3.22 determines the appetizer capsaicin content APP.CSC.001 numerical value, the appetizer capsaicin content APP.CSC.001 numerical value is added to the appetizer food pairing number APP.FPN.001 by the pairing device 110 in step 3.24. If the pairing device 110 does not detect an appetizer capsaicin content APP.CSC.001, the pairing device 110 returns to step 3.04 and returns the APP.FPN.001 to 0.

In step 3.26 the pairing device 110 generates a musical pairing number MPN.001 through the method of FIG. 1 that is as identical as possible to the appetizer food pairing number APP.FPN.001 determined in steps 3.06 through 3.24. In step 3.27 the pairing device 110 selects musical records M.REC.001-M.REC.N having a musical pairing number MPN.001-MPN.N which approaches or is identical to the appetizer food pairing number APP.FPN.001. In step 3.28 the pairing device 110 determines whether the musical pairing number MPN.001 and the appetizer food pairing number APP.FPN.001 match. If the pairing device 110 determines in step 3.28 that the appetizer food pairing number APP.FPN.001 and the musical pairing number MPN.001 do not match closely enough, the pairing device 110 advances to step 3.30, wherein the appetizer food pairing number APP.FPN.001 is broadened. The pairing device 110 subsequently repeats the loop of steps 3.27 through 3.28 until the determination in step 3.28 is positive. When the determination in step 3.28 is positive the pairing device 110 advances to step 3.32, wherein the pairing device 110 renders the musical record M.REC.001. The pairing device 110 then proceeds to step 3.34, wherein the pairing device 110 determines whether to terminate the process. When the determination in step 3.34 is positive, the pairing device 110 proceeds to step 3.36, wherein alternate processes are executed. When the determination in step 3.34 is negative, the pairing device 110 returns to step 3.04 and re-executes the loop of steps 3.04 through 3.34 as necessary.

The method of FIG. 2 may be more clearly comprehended by means of the equation $$APP.FPN=APP.PROT+APP.BRD+APP.CKM+APP.CSC$$

where APP.FPN represents the numerical value associated with the appetizer food pairing number, APP.PROT represents the numerical value associated with the primary ingredient (usually a protein) in a designated appetizer selection, BRD represents the numerical value associated with the bread designation in the designated appetizer selection, APP.CKM represents the numerical value associated with the way in which the appetizer was prepared, and APP.CSC represents the numerical value associated with the level of spice in the appetizer (this incorporates both the level of salt and the capsaicin concentration present in the food selection).

An example may serve to further demonstrate the methods of the FIG. 1 and FIG. 2. Take as the food serving a grilled prime rib, with a horseradish béchamel. In step 2.06 of FIG. 2 it will be determined that the protein type PROT.001 is beef. According to the previously determined numerical value of beef, the food pairing number FPN.001 begins at 4. The sauce type SCT.001 is a béchamel, as determined in step 2.10 of FIG. 2, which adds a numerical value of 1, according to the previously determined numerical values. The addition of the sauce type SCT.001 brings the total food pairing number FPN.001 to 5 at step 2.12. The cooking method CKM.001 for this meal is grilling, which adds a numerical value of 2 to the total food pairing number FPN.001; in step 2.16 the total food pairing number FPN.001 is 7. The horseradish in the dish adds numerical value both in the sauce type SCT.001 and in the "spiciness" category of CSC.001. Thus, the horseradish cream adds a numerical value of 4 to the total food pairing number FPN.001, bringing the food pairing number FPN.001 to 11 in total at the end of the method of FIG. 2.

The musical record M.REC.001 with which this meal ought to be served, should ideally have a musical pairing number MPN.001 approaching or identical to the food paring number FPN.001 of 11. Beginning with the genre of music GEN.001, the choice may optionally be operatic classical; this choice of genre will define the subsequent musical record M.REC.001-M.REC.N choices. Operatic classical music begins the musical pairing number MPN.001 at 4 in step 1.08. Subsequently the tempo TEMP.001 is determined to be slow, which adds a numerical value of 3 to the musical pairing number MPN.001, bringing the total MPN.001 to 7 in step 1.12. In determining that the genre GEN.001 would be operatic classical music, the user determined that the primary instrument PR.IN.001 would be vocals; in this particular instance, the vocal type is alto, which adds a numerical value of 1 to the musical pairing number MPN.001, bringing the total MPN.001 to 8 in step 1.16. Finally the dynamics DYN.001 of the musical record M.REC.001-M.REC.N must be determined. Because the food pairing number FPN.001 was 11, the dynamics of the musical record M.REC.001-M.REC.N must be approximately 3. To this end, the dynamics DYN.001 the song is determined to be "strong," with multiple forte and crescendo, which adds a numeric value of 3. The total musical pairing number MPN.001 in step 1.20 is 11, exactly matching the food pairing number FPN.001. The pairing device 110 will subsequently need to choose a musical record M.REC.001-M.REC.N that is classical opera, sung by an alto, with a slow tempo, and strong dynamics in order to properly complement the dish of grilled prime rib, with a horseradish béchamel sauce.

Figure 4:
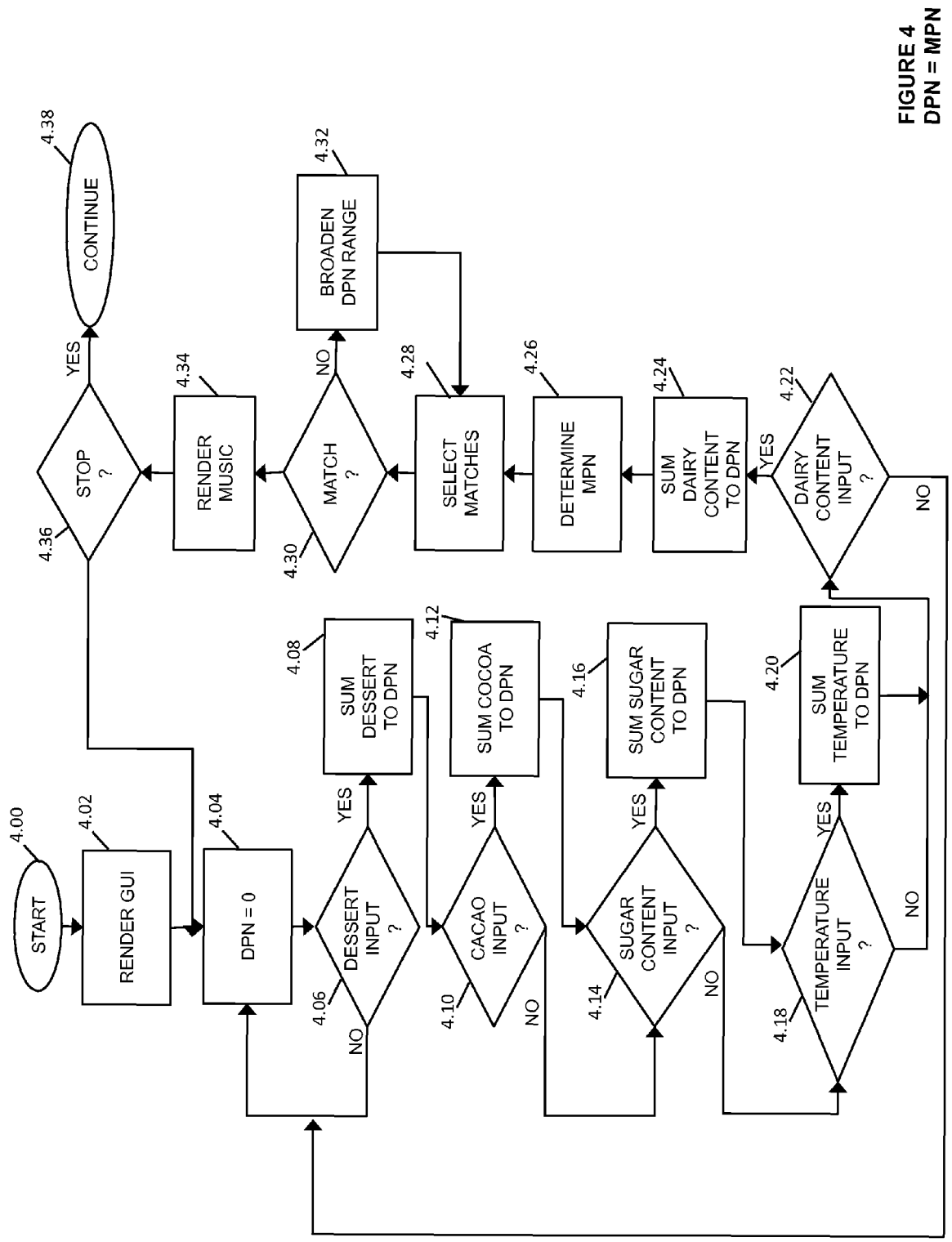
FIG. 4 is a flowchart of a yet further aspect of the invented method whereby the pairing device generates a dessert pairing number and associates the dessert pairing number with a designated musical pairing number.

Referring now generally to the Figures, and particularly to FIG. 4, FIG. 4 is a flowchart of the invented method whereby the pairing device 110 generates a dessert pairing number DPN.001 and matches the dessert pairing number DPN.001 to the food pairing number FPN.001, the beverage pairing number BPN.001 and musical pairing number MPN.001 generated by means of the methods of FIG. 1, FIG. 2, and FIGS. 5 through 10. In step 4.02 the pairing device 110 renders a graphic user interface GUI.001 for the purpose of allowing a user to view and input data. In step 4.04 the pairing device 110 sets the dessert pairing number DPN.001 to zero. In step 4.06 the pairing device 110 determines whether a dessert type input DES.001-DES.N has been entered. The dessert type input DES.001 may optionally be determined from a plurality of dessert types, including but not limited to cake, pie, ice cream, and/or candy. Each dessert type value DES.001-DES.N is designated with a previously determined numerical value, which may be added to the dessert pairing number DPN.001. When the pairing device 110 has determined a dessert type value DES.001 in step 4.06, the pairing device 110 advances to step 4.08. In step 4.08 the pairing device 110 sums the numerical value associated with the dessert type value DES.001 to the dessert pairing number DPN.001. When the determination in step 4.06 is negative, the pairing device 110 returns to step 4.04 and resets the DPN.N to 0.

When the pairing device 110 has completed the execution of step 4.08, the pairing device 110 advances to step 4.10. In step 4.10 the pairing device 110 determines whether a cacao level value CCO.001 has been inputted. The cacao level value may optionally be selected from a range of numerical values associated with cacao level designations, ranging from 0 to 5. Each cacao level input CCO.001 is assigned a previously determined numerical value, comprising: the numerical value of 0, which represents "no discernible cacao;" the numerical value 1, representing "white chocolate," which contains less than 20% cacao; the numerical value 2, representing "milk chocolate," which contains between 10% and 30% cacao; the numerical value 3, representing "semi-sweet chocolate," which contains 31% and 50%; the numerical value 4, representing "dark chocolate," which contains between 51% and 70%; and the numerical value 5, representing "very dark or bittersweet," which contains more than 70% cacao. When the pairing device 110 determines the cacao level value CCO.001, the pairing device 110 advances to step 4.12, wherein the numerical value of the cacao level value CCO.001 is summed with the dessert pairing number DPN.001. Alternatively, if the pairing device 110 does not determine a cacao level value CCO.001 in step 4.10, or when the numerical value of the cacao level input CCO.001 has been summed to the dessert pairing number DPN.001 in step 4.12, the pairing device 110 advances to step 4.14.

In step 4.14 the pairing device 110 determines whether a sugar content value SUG.001 has been inputted. The sugar content value SUG.001 may optionally be determined from a spectrum of numerical values associated with the sugar content SUG.001, which spectrum ranges from the extreme of "no sugar or sweetener added" through the extreme of "artificial sweetener detected". To each of the of sugar content values SUG.001 along the sugar content spectrum, a numerical value is assigned, which numerical value may be added to the dessert pairing number DPN.001. The designation "no sugar or sweetener added" is associated with the numerical value of 0; the designation "honey" is associated with a numerical value of 1; the designation "slightly discernible sugar" is associated with a numerical value of 2; the designation "noticeable sugar" is associated with a numerical value of 3; the designation "extreme sugar" is associated with a numerical value of 4; and the designation of "artificial sweetener detected" is associated with a numerical value of 5. When the pairing device 110 has assigned a numerical value associated with the sugar content value SUG.001, the pairing device 110 advances to step 4.16. In step 4.16 the pairing device 110 sums the numerical value associated with the sugar content value SUG.001 and the dessert pairing number DPN.001; subsequent to summing the sugar content value SUG.001 and the dessert pairing number DPN.001, the pairing device 110 proceeds to step 4.18. In the alternative, if no sugar content value SUG.001 may be assigned to the designated dessert selection DES.001, i.e. if the determination in step 4.14 is negative, the pairing device 110 advances to step 4.18.

In step 4.18 the pairing device 110 determines whether a temperature value TEMP.001-TEMP.N has been inputted. The numerical value assigned to the temperature value TEMP.001 may optionally be determined from a range of temperature values TEMP.001-TEMP.N, which numerical values may be found between 0 and 6. Each temperature value TEMP.001-TEMP.N along the temperature value spectrum may optionally be assigned a previously determined numerical value, which previously determined value may be summed with the dessert pairing number DPN.001. The designation "frozen" is associated with the numerical value 0; the temperature designation "partially frozen" is associated with the numerical value 1; the temperature designation "chilled" is associated with the numerical value 2; the temperature designation "warm" is associated with the numerical value 3; the temperature designation "hot" is associated with the numerical value 4; and the temperature designation "mixture of hot and cold" is associated with the numerical value 5. When the determination in step 4.18 is positive, i.e. the pairing device 110 determines that a temperature value TEMP.001 has been inputted, the pairing device 110 advances to step 4.20. In step 4.20 the pairing device 110 sums the temperature value TEMP.001 to the dessert pairing number DPN.001. The pairing device 110 subsequently advances to step 4.22. Alternatively, when the determination in step 4.18 is negative, and the pairing device 110 does not detect a temperature value TEMP.001 input, the pairing device 110 advances to step 4.22.

In step 4.22 the pairing device 110 determines whether a dairy content indicator DAI.001-DAI.N has been input. The dairy content indicator DAI.001 may optionally be determined based upon a spectrum of potential dairy content indicators DAI.001-DAI.N, ranging between the numerical values of 0 and 4. Each dairy content indicator DAI.001 may optionally be assigned a previously determined numerical value, which previously determined value may be summed with the dessert pairing number DPN.001. The predetermined numerical values associated with the dairy content indicator DAI.001-DAI.N are: the numerical value 0, associated with "no dairy;" the numerical value 1, associated with "butter;" the numerical value 2, associated with "milk;"

the numerical value 3, associated with "cream;" and the numerical value 4, associated with "whipped cream." The dessert in question may contain more than a single dairy indicator, in which case the pairing device 110 may optionally sum a plurality of dairy content indicators DAI.001-DAI.N for a more accurate total dairy content indicator DAI.001, for example, if a designated desert DES.N contains both milk and whipped cream, the pairing device 110 may include dairy content indicators DAI.001-DAI.N for both milk and whipped cream. When the pairing device 110 in step 4.22 determines that a dairy content indicator DAI.001 has been entered, the pairing device 110 advances to step 4.24, wherein the dairy content indicator DAI.001 is summed with the dessert pairing number DPN.001. Alternatively, when the determination in step 4.22 is negative, the pairing device 110 returns to step 4.04, and returns the dessert pairing number DPN.N to zero.

In step 4.26 the pairing device 110 generates a musical pairing number MPN.001 according to the method of FIG. 1 that is as identical as possible to the dessert pairing number DPN.001 determined in steps 4.06 through 4.24. In step 4.28 the pairing device 110 selects musical records M.REC.001-M.REC.N having a musical pairing number MPN.001-MPN.N which approaches or is identical to the dessert pairing number DPN.001. In step 4.30 the pairing device 110 determines whether the musical pairing number MPN.001 and the dessert pairing number DPN.001 match. If the pairing device 110 determines in step 4.30 that the dessert pairing number DPN.001 and the musical pairing number MPN.001 do not match closely enough, the pairing device 110 advances to step 4.32, wherein the dessert pairing number DPN.001 is broadened. The pairing device 110 subsequently repeats the loop of steps 4.28 through 4.32 until the determination in step 4.30 is positive. When the determination in step 4.30 is positive, the pairing device 110 advances to step 4.34, wherein the pairing device 110 renders the musical record M.REC.001. The pairing device 110 then proceeds to step 4.36, wherein the pairing device 110 determines whether to terminate the process. When the determination in step 4.36 is positive, the pairing device 110 proceeds to step 4.38, wherein alternate processes are executed. When the determination in step 4.36 is negative, the pairing device 110 returns to step 4.04 and re-executes the loop of steps 4.04 through 4.36 as necessary.

The method of FIG. 4 may be more easily comprehended by means of the following equation $$DPN=CCO+SUG+TEMP+DAI$$

where DPN represents the desert pairing number, CCO represents a numerical value associated with the cacao input, SUG represents a numerical value associated with the sugar content, TEMP represents numerical value associated with the temperature of the designated dessert, and DAI represents numerical value associated with the a dairy content input of a designated dessert.

Figure 5:
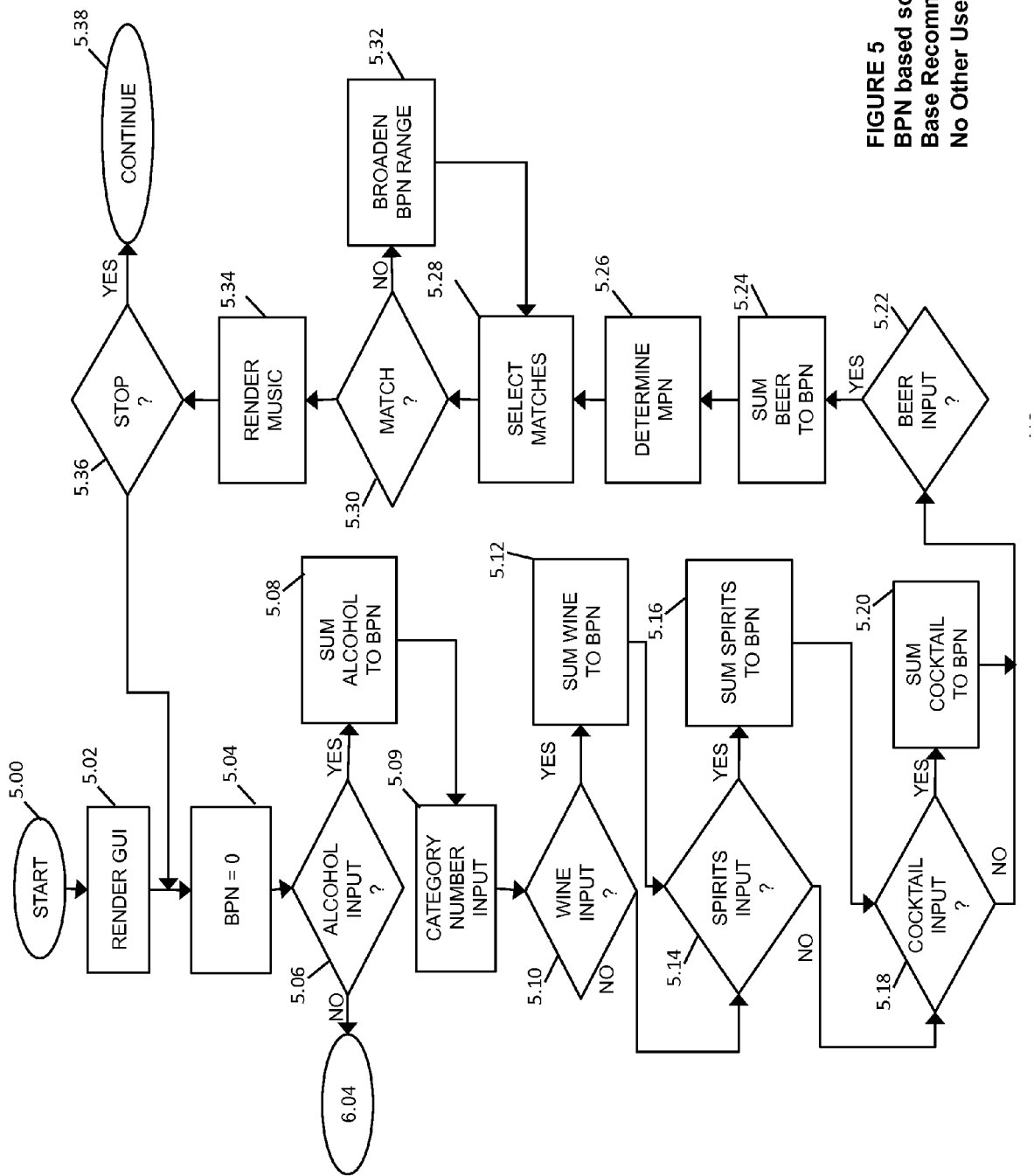
FIG. 5 is a flowchart of a yet further aspect of the invented method whereby the pairing device generates a beverage pairing number based upon the numerical value of the base type recommendation and associates the beverage pairing number with a designated musical pairing number.

Referring now generally to the Figures, and particularly to FIG. 5, FIG. 5 is a flowchart of the invented method whereby the pairing device 110 generates a beverage pairing number BPN.001 based solely upon a beverage type BTP.001-BTP.N, and matches the beverage pairing number BPN.001 to the food pairing number FPN.001 and musical pairing number MPN.001 generated through the methods of FIGS. 1-2. In step 5.02 the pairing device 110 renders a graphic user interface GUI.001 for the purpose of allowing a user to view and input data. In step 5.04 the pairing device 110 sets the beverage pairing number BPN.001 to zero. In step 5.06 the pairing device 110 determines whether a designated beverage BEV.001 contains an alcohol value ALC.001. The alcohol value ALC.001 of the designated beverage BEV.001 may optionally be determined from a plurality of alcoholic beverage types, including but not limited to wine, spirits, cocktails and/or beer/hops. Each alcohol value is designated with a previously determined numerical value, which may be added to the beverage pairing number BPN.001. If the pairing device 110 determines that the designated beverage BEV.001 does not contain an alcohol value ALC.001-ALC.N, the pairing device 110 sums the numerical value 0 to the beverage pairing number BPN.001 advances to step 5.04 of the method of FIG. 6. When the pairing device 110 has determined an alcohol value ALC.001 in step 5.06, the pairing device 110 advances to step 5.08. In step 5.08 the pairing device 110 sums the numerical value associated with the alcohol value ALC.001 to the beverage pairing number BPN.001. When the determination in step 5.06 is negative, the pairing device 110 returns to step 5.04 and resets the BPN.N to 0.

In step 5.09 the pairing device 110 determines a category value CAT.001 for designated beverage types BTP.001-BTP.N. The category values CAT.001-CAT.N have values ranging between 0 and 5, based upon the designated beverage's BEV.001 alcohol by volume (hereinafter "ABV"). The category values CAT.001-CAT.N are designated only for ease of categorization, and do not add to the beverage pairing number BPN.001. The category value CAT.001-CAT.N of a non-alcoholic beverage NAB.001-NAB.N (0% ABV) is 0; this category includes, but is not limited to, coffee, tea, fruit juice and water. The category value CAT.001-CAT.N of a designated beverage BEV.001-BEV.N with an ABV of up to 12% is 1; this category includes, but is not limited to beer, hard cider, and some sparkling wines. The category value CAT.001-CAT.N of a designated beverage BEV.001-BEV.N with an ABV of up to 15% is 2; this category includes, but is not limited to, most wines and tequila. The category value CAT.001-CAT.N of a designated beverage BEV.001-BEV.N with an ABV falling between 15% and 20% is 3; this category includes, but is not limited to, brandy and rum. The category value CAT.001-CAT.N of a designated beverage BEV.001-BEV.N with an ABV falling between 20% and 50% is 4; this category includes, but is not limited to, ouzo, vermouth, gin and vodka. The category CAT.001-CAT.N of a designated beverage BEV.001-BEV.N with an ABV above 50% is 5; this category includes, but is not limited to, whiskey, scotch and bourbon. The category value CAT.001-CAT.N allows the pairing device 110 to determine the proper category of beverages BEV.001-BEV.N from which a user may designate a more detailed beverage pairing number BPN.001-BPN.N.

In an optional alternate embodiment of the invented method, a user may optionally choose a general BPN.001-BPN.N based only upon whether the designated beverage contains an alcohol content ALC.001-ALC.N, and upon numerical value of the derived FPN.001, rather than continuing to generate a more detailed BPN.001-BPN.N, which more detailed BPN.001-BPN.N may be specific to the beverage type BTP.001-BTP.N, i.e. wine, spirit, cocktail, and/or beer.

When the pairing device 110 has completed the execution of step 5.08, the pairing device 110 advances to step 5.10. In step 5.10 the pairing device 110 determines whether a wine value WIN.001 has been inputted. The wine value WINE.001 may optionally be selected from a plurality of wine types, including but not limited to, sparkling, port, or a wine identified by certain grape varietals, such as Merlot, Riesling, Chardonnay, Syrah, and/or Pinot Noir. Each wine type WINE.001 is assigned a previously determined numerical value. Each wine type WINE.001 may optionally be further subdivided based upon a plurality of additional factors; such further subdivision alters the previously determined numerical value. When the pairing device 110 has determined the wine value WINE.001, the pairing device 110 advances to step 5.12, wherein the numerical value of the wine value WINE.001 is summed with the beverage pairing number BPN.001. Alternatively, if the pairing device 110 does not determine a wine value WINE.001 in step 5.10, or when the numerical value of the wine input WINE.001 has been summed to the beverage pairing number BPN.001 in step 5.12, the pairing device 110 advances to step 5.15.

In step 5.14 the pairing device 110 determines whether a spirits input SPIR.001 has been inputted. The spirits input SPIR.001 may optionally be determined from a plurality of types of spirits, including but not limited to, whiskey, vodka, gin and/or tequila. To each of these types of spirits SPIR.001, a numerical value is assigned, which numerical value may be added to the beverage pairing number BPN.001. Each type of spirit SPIR.001 may be further subdivided based on a plurality of factors, including but not limited to percentage of alcohol, age, and/or base ingredient. When the pairing device 110 has assigned a numerical value associated with the spirits input SPIR.001, the pairing device 110 advances to step 5.16. In step 5.16 the pairing device 110 sums the numerical value associated with the spirits input SPIR.001 and the beverage pairing number BPN.001; subsequent to summing the spirits input SPIR.001 and the beverage pairing number BPN.001, the pairing device 110 proceeds to step 5.18. In the alternative, if no spirits input SPIR.001 may be assigned to the designated beverage selection BEV.001, i.e. if the determination in step 5.14 is negative, the pairing device 110 advances to step 5.18.

In step 5.18 the pairing device 110 determines whether a cocktail value CTL.001 value has been inputted. The numerical value assigned to the cocktail value CTL.001 may optionally be determined from a variety of types of cocktails CTL.001-CTL.N, including but not limited to, simple mixed drinks, daiquiris, margaritas, coolers and/or punch. Each type of cocktail CTL.001-CTL.N may optionally be assigned a previously determined numerical value, which previously determined value may be summed with the beverage pairing number BPN.001. The cocktail value CTL.001 may be further subdivided based upon a plurality of factors, including but not limited to type of mixing agent, type of alcohol, and/or consistency. The further subdivision of the cocktail value CTL.001 may alter the predetermined numerical value assigned thereto. When the determination in step 5.18 is positive, i.e. the pairing device 110 determines that a cocktail value CTL.001 has been inputted, the pairing device 110 advances to step 5.20. In step 5.20 the pairing device 110 sums the cocktail value CTL.001 to the beverage pairing number BPN.001. The pairing device 110 subsequently advances to step 5.22. Alternatively, when the determination in step 5.18 is negative, and the pairing device 110 does not detect a cocktail value CTL.001 input, the pairing device 110 advances to step 5.22.

In step 5.22 the pairing device 110 determines whether a beer indicator BEER.001-BEER.N has been input. The beer indicator BEER.001 may optionally be determined based a upon a plurality of factors, including but not limited to "hoppiness," body, color, and/or international bitterness units ("IBUs"). Each beer indicator BEER.001-BEER.N may optionally be assigned a previously determined numerical value, which previously determined value may be summed with the beverage pairing number BPN.001. If the pairing device 110 in step 5.22 determines that a beer input BEER.001 has been entered, the pairing device 110 advances to step 5.24, wherein the beer input BEER.001 is summed with the beverage pairing number BPN.001. Alternatively, when the determination in step 5.22 is negative, the pairing device 110 returns to step 5.04, and returns the beverage pairing number BPN.001 to zero.

In step 5.26 the pairing device 110 generates a musical pairing number MPN.001 according to the method of FIG. 1 which musical pairing number MPN.001 is as identical as possible to the beverage pairing number BPN.001, as determined in steps 5.06 through 5.25. In step 5.28 the pairing device 110 selects musical records M.REC.001-M.REC.N having musical pairing numbers MPN.001-MPN.N which approach or are as identical as possible to the beverage pairing number BPN.001. In step 5.30 the pairing device 110 determines whether the musical pairing number MPN.001 and the beverage pairing number BPN.001 match. If the pairing device 110 determines in step 5.30 that the beverage pairing number BPN.001 and the musical pairing number MPN.001 do not match closely enough, the pairing device 110 advances to step 5.32, wherein the beverage pairing number BPN.001 is broadened. The pairing device 110 subsequently repeats the loop of steps 5.28 through 5.32 until the determination in step 5.30 is positive. When the determination in step 5.30 is positive, the pairing device 110 advances to step 5.34, wherein the pairing device 110 renders the musical record M.REC.001. The pairing device 110 then proceeds to step 5.36, wherein the pairing device 110 determines whether to terminate the process. When the determination in step 5.36 is positive, the pairing device 110 proceeds to step 5.38, wherein alternate processes are executed. When the determination in step 5.36 is negative, the pairing device 110 returns to step 5.04 and re-executes the loop of steps 5.04 through 5.36 as necessary.

The method of FIG. 5 may be more clearly comprehended by means of the equation $$ALC = Beer \text{ or } WINE \text{ or } SPIR \text{ or } CTL,$$

where ALC represents the numerical value associated with the alcohol content of a designated beverage selection, WINE represents a numerical value associated with the wine input, SPIR represents a numerical value associated with the hard alcohol/spirits input, CTL represents a numerical value associated with the cocktail input, and BEER represents a numerical value associated with the beer input.

Figure 6:
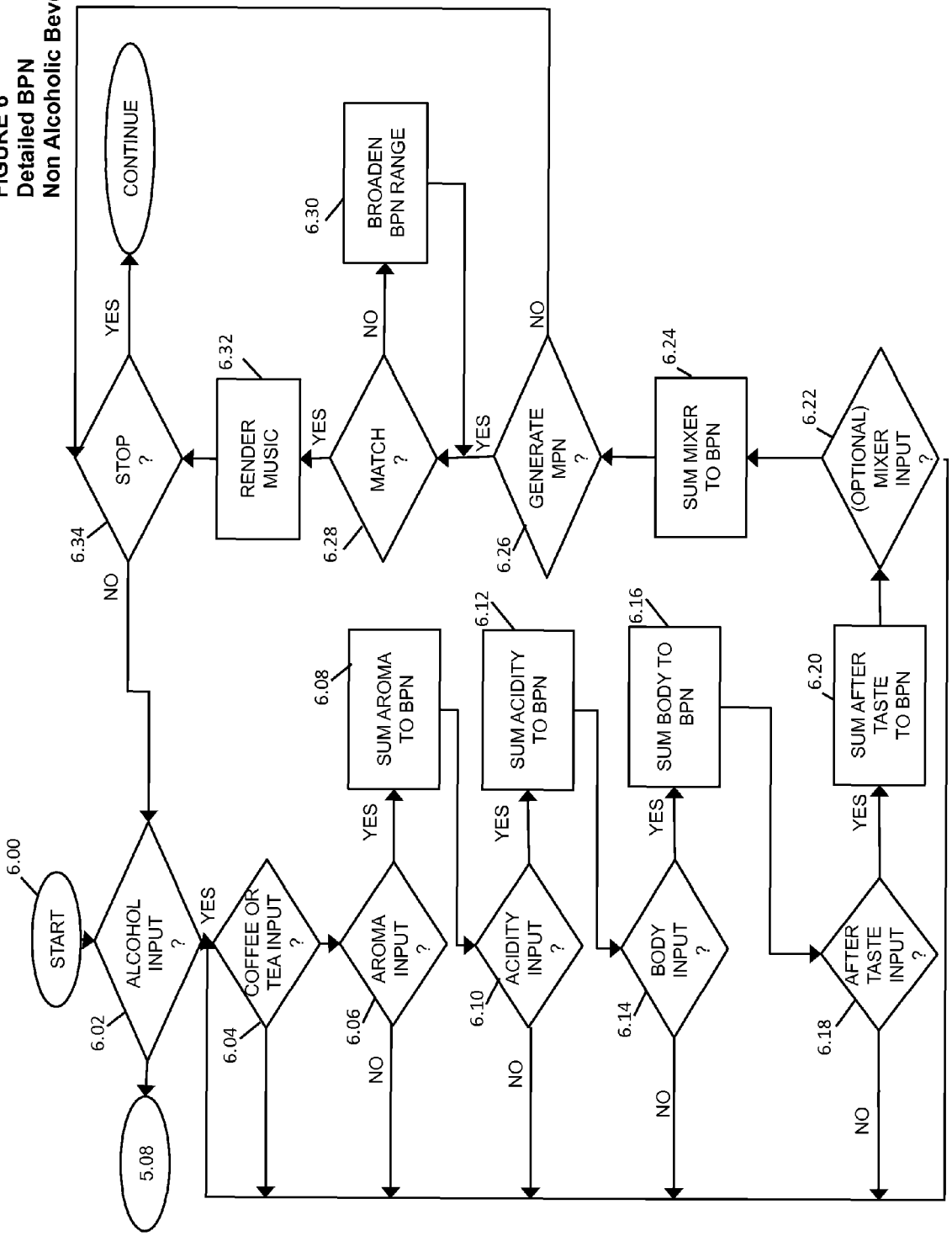
FIG. 6 is a flowchart of an additional aspect of the invented method whereby the pairing device generates the beverage pairing number of a non-alcoholic beverage.

Referring now generally to the Figures and particularly to FIG. 6, FIG. 6 is a flowchart of a further aspect of the invented method whereby the pairing device 110 generates a detailed beverage pairing number BPN.001-BPN.N based upon a non-alcoholic beverage input NAB.001-NAB.N. In step 6.02 the pairing device 110 determines whether the designated beverage BEV.001 contains an alcohol input ALC.001-ALC.N. When the determination in step 6.02 is positive, the pairing device 110 returns to step 5.08 of the method of FIG. 4. When the determination in step 6.02 is negative, the pairing device 110 advances to step 6.04. In step 6.04 the pairing device 110 determines whether the designated beverage BEV.001 is coffee or tea. When the determination in step 6.04 is negative, the pairing device 110 returns to step 6.02. When the determination in step 6.04 is positive, the pairing device 110 advances to step 6.06, wherein the pairing device 110 determines an aroma input ARM.001-ARM.N of the designated non-alcoholic beverage NAB.001. The aroma input ARM.001 may be associated with the range of numerical values 1 through 5, 1 representing "no aroma," and 5 representing "strong aroma." When the determination in step 6.06 is negative, and the pairing device 110 receives no aroma input ARM.001-ARM.N, the pairing device 110 returns to step 6.02. When the pairing device 110 determines an aroma input ARM.001-ARM.N, the pairing device 110 proceeds to step 6.08, wherein the numerical value of the aroma input ARM.001 is summed o the beverage pairing number BPN.001.

When the pairing device 110 has summed the aroma ARM.001 to the beverage pairing number BPN.001 in step 6.08, the pairing device 110 advances to step 6.10. In step 6.10 the pairing device 110 determines whether an acidity input NAB.ACD.001-NAB.ACD.N has been inputted. The acidity input NAB.ACD.001 of a designated non-alcoholic beverage NAB.001 may range from a numerical value of 1 to a numerical value of 5, 1 representing "very low acidity" and 5 representing "extremely acidic." When the determination in step 6.10 is negative, the pairing device 110 returns to step 6.02. In the alternative, when the determination in step 6.10 is positive, and the pairing device 110 has determined an acidity input NAB.ACD.001, the pairing device 110 sums the acidity input NAB.ACD.001 to the beverage pairing number BPN.001 in step 6.12. In step 6.14 the pairing device 110 determines whether a "body" designation NAB.BDY.001 has been inputted. The numerical value assigned to the body designation NAB.BDY.001 may range from 1 through 5, where 1 indicates a very low body or mellow body designation NAB.BDY.001 and 5 indicates a very high body or very robust body designation NAB.BDY.001. When determination in step 6.14 is negative, the pairing device 110 returns to step 6.02. When the determination in step 6.14 is positive, the pairing device 110 advances to step 6.16, wherein the pairing device 110 sums the body indication NAB.BDY.001 to the beverage pairing number BPN.001. Subsequently, the pairing device 110 determines in step 6.18 whether an aftertaste designation NAB.AFT.001-NAB.AFT.N is available for the designated non-alcoholic beverage NAB.001. The aftertaste designation NAB.AFT.001 may be selected from a spectrum of numerical values associated with the aftertaste designation, ranging from 1 through 5, 1 representing "very slight, non-lingering aftertaste" and 5 representing "very sharp, lingering aftertaste." When no aftertaste designation NAB.AFT.001 is determined in step 6.18, the pairing device 110 returns to the execution of step 6.02. When the pairing device 110 is able to determine an aftertaste input NAB.AFT.001, the pairing device 110 sums the after taste input NAB.AFT.001 to the beverage pairing number BPN.001. The pairing device 110 subsequently advances to optional step 6.22, wherein the pairing device 110 determines whether a designated non-alcoholic beverage NAB.001 contains a non-alcoholic mixer NAM.001-NAM.N. The non-alcoholic mixer may be summed to the beverage pairing number BPN.001 based upon the predetermined numerical value associated with the type of non-alcoholic mixer NAM.001-NAM.N being added to the designated non-alcoholic beverage NAB.001. When the pairing device 110 determines that no non-alcoholic mixer indication NAM.001-NAM.N may be retrieved, the pairing device 110 returns to step 6.02. Alternatively, when the pairing device 110 determines that a non-alcoholic mixer indication NAM.001 may be retrieved, the pairing device 110 sums the non-alcoholic mixer indication NAM.001 to the beverage pairing number BPN.001.

In step 6.26 the pairing device 110 determines whether to generate a musical pairing number MPN.001 by means of the method of FIG. 1. When the determination in step 6.26 is negative, the pairing device 110 advances to step 6.34. In the alternative, when the determination in step 6.26 is positive, the pairing device 110 advances to step 6.28, wherein the pairing device 110 determines whether the beverage pairing number BPN.001 and the musical pairing number MPN.001 generated in step 6.26 match exactly. When the pairing device 110 determines in step 6.28 that the beverage pairing number BPN.001 and the musical pairing number MPN.001 do not match exactly, the pairing device 110 advances to step 6.30, wherein the pairing device 110 broadens the range of potential beverage pairing numbers BPN.001-BPN.N. The pairing device 110 subsequently returns to step 6.28, wherein the pairing device 110 re-executes the loop of steps 6.28 through 6.30 until the determination in step 6.28 is positive. When the determination in step 6.28 is positive, the pairing device 110 advances to step 6.32. In step 6.32 the pairing device 110 renders a musical record M.REC.001-M.REC.N based upon the determined musical pairing number MPN.001. In step 6.34 the pairing device 110 determines whether to terminate the process. When the determination in step 6.34 is positive, the pairing device 110 continues to alternate processes. When the determination in step 6.34 is negative, the pairing device 110 returns to step 6.02 and re-executes the loop of steps 6.02 through 6.34 as necessary.

The method of FIG. 6 may be more easily comprehended through the use of the equation $$BPN = ARM + NAB.BOD + NAB.ACD + NAB.AFT + NAM$$

where BPN is the numerical value associated with the beverage pairing number for a designated non-alcoholic beverage, ARM is the numerical value associated with the aroma indicator, NAB.BOD is the numerical value associated with the body indicator, NAB.ACD is the numerical value associated with the acidity indicator, NAB.AFT is the numerical value associated with the aftertaste indicator, and NAM is the numerical value associated with the optional non-alcoholic mixer.

Figure 7:
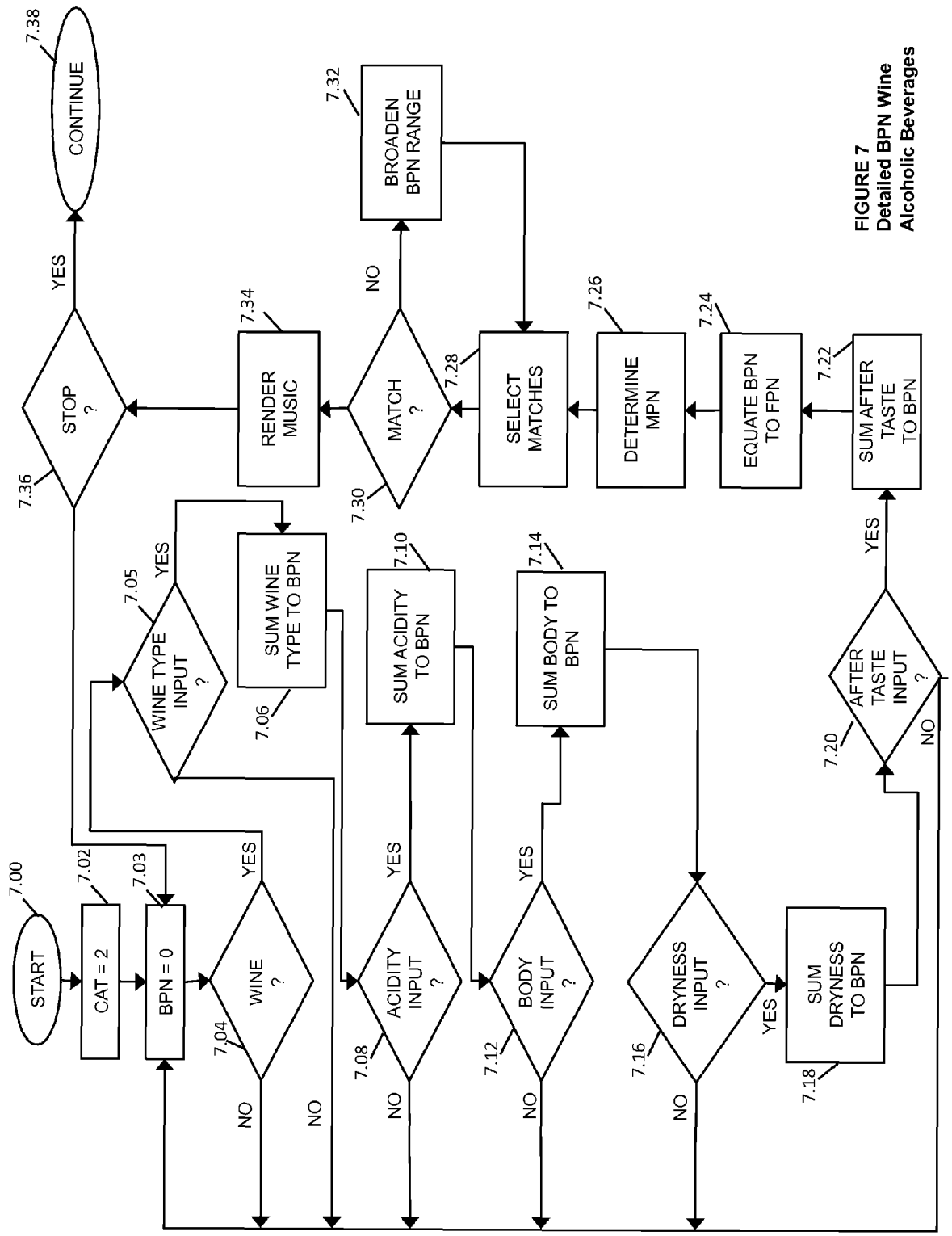
FIG. 7 is a flowchart of a yet further aspect of the invented method whereby the pairing device generates the beverage pairing number of a wine designation.

Referring now generally to the Figures and particularly to FIG. 7, FIG. 7 is a flowchart of the invented method whereby the pairing device 110 determines a beverage pairing number BPN.001 based upon a wine designation WINE.001-WINE.N. In step 7.02 the pairing device 110 determines that the category value CAT.001 for the designated alcoholic beverage BEV.001 is 2. In step 7.03 the pairing device 110 sets the beverage pairing number BPN.001 to 0. In step 7.04 the pairing device 110 determines whether a wine designation WINE.001-WINE.N is present. When the pairing device 110 determines that a wine designation WINE.001 is not present, the pairing device 110 returns to step 7.03, wherein the pairing device 110 resets the beverage pairing number BPN.001 to 0. Alternatively, when the pairing device 110 determines that a wine designation WINE.001 is present, the pairing device 110 proceeds to the determination of step 7.05. In step 7.05 the pairing device 110 determines the type of wine input WIN.TYP.001-WIN.TYP.N. The wine type input WIN.TYP.001 may be associated with the numerical values of 3 through 15. More particularly, sparkling wine is associated with the numerical values of 3 through 5; white wines are associated with the numerical values of 5 through 6; rosé wines are associated with the numerical values of 6 through 7; red wines are associated with the numerical values of 7 through 8; sake is associated with the numerical values of 9 through 10; liqueur and dessert wines are associated with the numerical values of 10 through 11; and fortified wines are associated with the numerical values of 12 through 15. When the pairing device 110 has determined in step 7.05 the wine type designation input WIN.TYP.001, the pairing device 110 sums the wine type designation WIN.TYP.001 to the beverage pairing number BPN.001 in step 7.06.

In step 7.08 the pairing device 110 determines whether an wine acidity designation WIN.ACD.001-WIN.ACD.N is present. The wine acidity designation WIN.ACD.001 may be associated with the numerical values 1 through 5, 1 being associated with "very high acid" and 5 being associated with "low or no acid." When the pairing device 110 determines that the wine acidity designation WIN.ACD.001 is present in step 7.08, the pairing device 110 advances to step 7.10 and sums the wine acidity designation WIN.ACD.001 to the beverage pairing number BPN.001. When the pairing device 110 determines in step 7.08 that no wine acidity designation WIN.ACD.001 is present, the pairing device 110 returns to step 7.03, wherein the pairing device 110 resets the beverage pairing number BPN.001 to 0. In step 7.12 the pairing device 110 determines whether a wine body designation WIN-.BDY.001 exists. The wine body designation WIN.BDY.001 may be associated with the numerical values of 1 through 5, 1 indicating "weak bodied" and 5 indicating "full bodied." When the pairing device 110 determines in step 7.12 that the wine body designation WIN.BDY.001 is present, the pairing device 110 advances to step 7.14 and sums the wine body designation WIN.BDY.001 to the beverage pairing number BPN.001. When the pairing device 110 does not detect a wine body designation WIN.BDY.001, the pairing device 110 returns to step 7.02 and resets the beverage pairing number BPN.001 to 0.

In step 7.16 the pairing device 110 determines whether a dryness designation WIN.DRY.001-WIN.DRY.N is detected. The dryness designation WIN.DRY.001 may be associated with the numerical values of 1 through 5, 1 indicating "sweet," and 5 indicating "extremely dry." When the pairing device 110 has determined in step 7.16 that a dryness designation WIN.DRY.001 is present, the pairing device 110 sums the dryness designation WIN.DRY.001 to the beverage pairing number BPN.001 in step 7.18. In the alternative, when the pairing device 110 does not detect a dryness designation WIN.DRY.001 in step 7.16, the pairing device 110 returns to step 7.02 wherein the pairing device 110 resets the beverage pairing number BPN.001 to 0. In step 7.20 the pairing device 110 determines whether an aftertaste designation WIN.AFT.001-WIN.AFT.N is detected. The aftertaste designation WIN.AFT.001 may be associated with the numerical values of 1 through 5, 1 indicating "no aftertaste," and 5 indicating "sharp, lingering aftertaste." When the pairing device 110 determines in step 7.20 that no aftertaste designation WIN.AFT.001 is present, the pairing device 110 returns to step 7.02 and resets the beverage pairing number BPN.001 to 0. Alternatively, when the pairing device 110 determines in step 7.20 that an aftertaste designation WIN.AFT.001 is present, the pairing device 110 advances to step 7.22, wherein the pairing device 110 sums the aftertaste designation WIN.AFT.001 to the beverage pairing number BPN.001 in step 7.22.

The pairing device 110 subsequently advances to step 7.24, wherein the pairing device 110 sets the numerical value associated with the BPN.001 as determined in the method of this Figure equal to the numerical value of an FPN.001 as determined in the method of FIG. 2. When the pairing device 110 has equated the BPN.001 and the FPN.001, the pairing device 110 advances to step 7.26, wherein the pairing device 110 determines an MPN.001, using the method of FIG. 1. In step 7.28 the selects musical record M.REC.001-M.REC.N which may have numerical values approaching or being exactly similar to the numerical values of the BPN.001 and the FPN.001. When the pairing device 110 has selected potential matches in step 7.28, the pairing device 110 determines whether the potential matches are compatible with the numerical value of the BPN.001 in step 7.30. When the pairing device 110 determines in step 7.30 that the musical record selections M.REC.001-M.REC.N are not compatible with the numerical value of the BPN.001, the pairing device 110 proceeds to step 7.32 and broadens the range of potential matches to the numerical value of the BPN.001. The pairing device 110 subsequently returns to step 7.28 and executes the loop of steps 7.28 through 7.32 until the determination in step 7.30 is positive. In the alternative, when the determination in step 7.30 is positive, and the pairing device 110 has determined a match between the BPN.001, the FPN.001, and the MPN.001, the pairing device 110 renders the musical record M.REC.001 in step 7.34. The pairing device 110 then proceeds to step 3.36, wherein the pairing device 110 determines whether to terminate the process. When the determination in step 3.36 is negative, the pairing device 110 returns to step 7.03, and executes the loop of steps 7.03 through 7.36 as necessary. Alternatively, when the pairing device 110 determines to terminate the process, the pairing device 110 advances to step 7.38 and continues to alternate processes.

The method of FIG. 7 may be more clearly comprehended by means of the equation $$BPN=WIN.ACD+WIN.BOD+WIN.DRY+WIN.AFT$$

where BPN is the numerical value associated with the beverage pairing number for a designated wine, WIN.ACD is the numerical value associated with the acidity value, WIN.BOD is the numerical value associated with the body value, WIN.DRY is the numerical value associated with the dryness value and WIN.AFT is numerical value associated with the aftertaste value.

Figure 8:
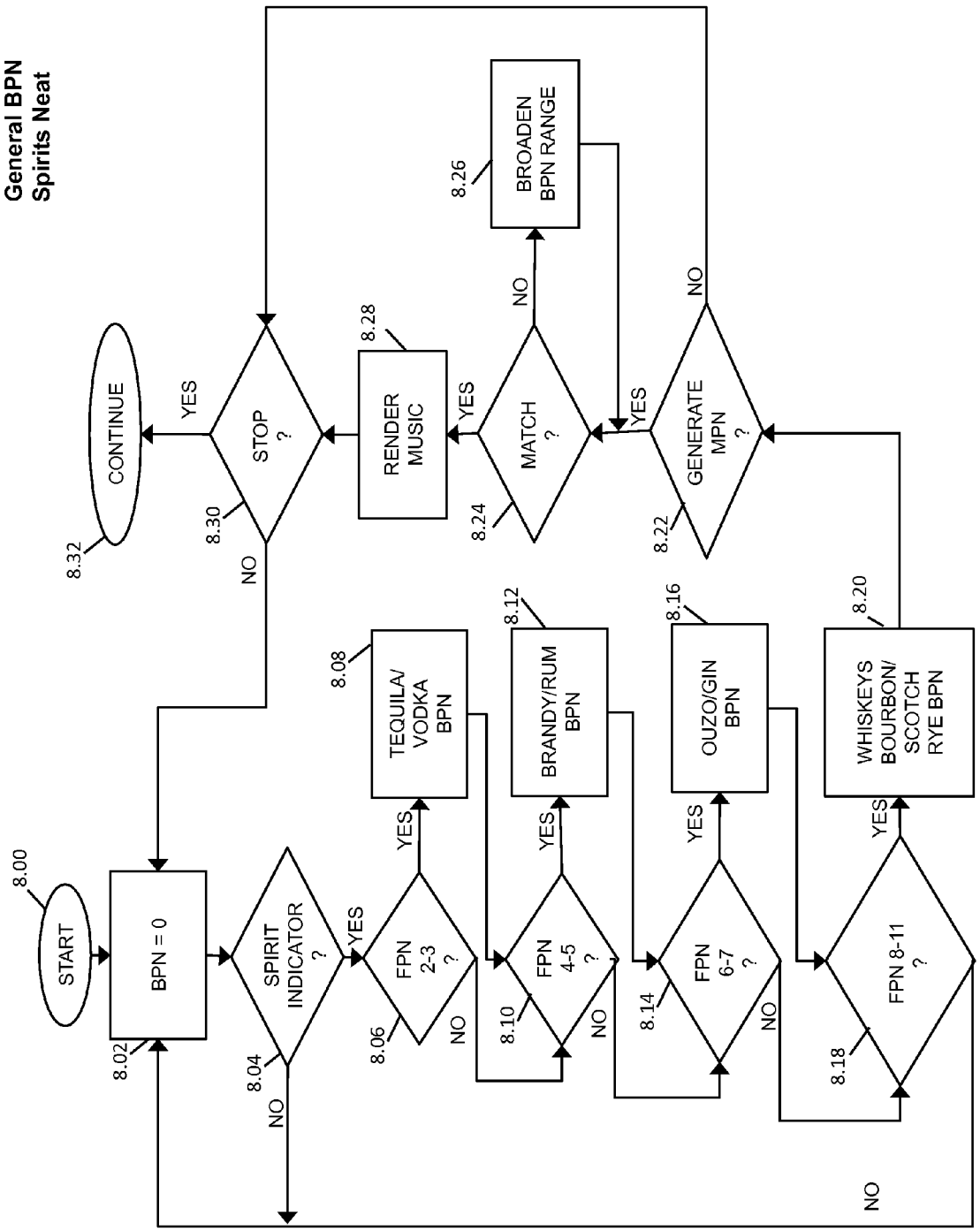
FIG. 8 is a flowchart of a yet additional method of the invented method whereby the pairing device generates a beverage pairing number for a spirits designation.

Referring now generally to the Figures and particularly to FIG. 8, FIG. 8 is a flowchart of a yet further aspect of the invented method, whereby the pairing device 110 determines a spirits designation SPIR.001 (wherein the spirits are served "neat," i.e. without the presence of a mixer) for addition to the beverage pairing number BPN.001 based upon a designated food pairing number FPN.001. In step 8.02 the pairing device 110 sets the beverage pairing number BPN.001 to 0. In step 8.04 the pairing device 110 determines whether a spirits designation SPIR.001 is present. The spirits designation SPIR.001 is associated with the numerical values of 1 through 11. The spirits designation SPIR.001 may include, but is not limited to tequila (associated with the numerical value of 2), vodka (associated with the numerical value of 3), brandy (associated with the numerical value of 4), rum (associated with the numerical value of 5), ouzo (associated with the numerical value of 6), gin (associated with the numerical value of 7), bourbon (associated with the numerical value of 8), scotch whiskey (associated with the numerical value of 10), and rye (associated with the numerical value of 11). When the pairing device 110 does not detect a spirits designation SPIR.001 in step 8.04, the pairing device 110 returns to step 8.02 and resets the beverage pairing number BPN.001 to 0. When the pairing device 110 does detect a spirits designation SPIR.001, the pairing device 110 advances to step 8.06 wherein the pairing device 110 determines whether the food pairing number FPN.001 determined through the method of FIG. 2 has a numerical value between 2 and 3. When the determination in step 8.06 is positive, the pairing device 110 advances to step 8.08, wherein the numerical value associated with the spirits designation SPIR.001 for either tequila or vodka is summed to the beverage pairing number BPN.001. When the pairing device 110 has completed the execution of step 8.08, or alternatively when the determination in step 8.06 is negative, the pairing device 110 proceeds to step 8.10. In step 8.10 the pairing device 110 determines whether the food pairing number FPN.001 determined through the method of FIG. 2 has a numerical value between 4 and 5. When the determination in step 8.10 is positive, the pairing device 110 advances to step 8.12, wherein the numerical value associated with the spirits designation SPIR.001 for either brandy or rum is summed to the beverage pairing number BPN.001. When the pairing device 110 has completed the execution of step 8.12, or alternatively when the determination in step 8.10 is negative, the pairing device 110 proceeds to step 8.14. In step 8.14 the pairing device 110 determines whether the food pairing number FPN.001 determined through the method of FIG. 2 has a numerical value between 6 and 7. When the determination in step 8.14 is positive, the pairing device 110 advances to step 8.16, wherein the numerical value associated with the spirits designation SPIR.001 for either ouzo or gin is summed to the beverage pairing number BPN.001. When the pairing device 110 has completed the execution of step 8.16 or alternatively when the determination in step 8.14 is negative, the pairing device 110 proceeds to step 8.18.

In step 8.18 the pairing device 110 determines whether the food pairing number FPN.001 determined through the method of FIG. 2 has a numerical value between 8 and 11. When the determination in step 8.18 is positive, the pairing device 110 advances to step 8.20, wherein the numerical value associated with the spirits designation SPIR.001 for either whiskey, or bourbon, or scotch, or rye is summed to the beverage pairing number BPN.001. When the determination in step 8.18 is negative, the pairing device 110 returns to step 8.02 and resets the beverage pairing number BPN.001 to 0. When the pairing device 110 has completed the execution of step 8.20, the pairing device 110 advances to step 8.22, wherein the pairing device 110 determines whether to generate a musical pairing number MPN.001 using the method of FIG. 1, with a numerical value approaching or identical to the FPN.001 and the BPN.001. When the determination in step 8.22 is negative, the pairing device 110 advances to step 8.30. In the alternative, when the determination in step 8.22 is positive, the pairing device 110 proceeds to step 8.24. In step 8.24, the pairing device 110 determines whether the musical records M.REC.001-M.REC.N are available with musical pairing number MPN.001 that approaches or is identical to the BPN.001. When the determination in step 8.24 is negative, the pairing device 110 broadens the range of numerical values associated with the BPN.001 in step 8.26, and subsequently returns to step 8.24 and re-executes the loop of steps 8.24 through 8.26 until the determination in step 8.24 is positive. When the determination in step 8.24 is positive, i.e. the pairing device 110 determines that the musical records M.REC.001-M.REC.N are available with musical pairing numbers MPN.001-MPN.N that approach or are identical to the BPN.001, the pairing device 110 renders the musical record M.REC.001 in step 8.28. When the pairing device 110 has rendered the designated musical record M.REC.001 in step 8.28, the pairing device 110 advances to step 8.30, wherein the pairing device 110 determines whether to terminate the process. When the determination in step 8.30 is positive, the pairing device 110 advances to step 8.32, wherein alternate processes are executed. Alternatively when the determination in step 8.30 is negative, the pairing device 110 returns to step 8.02 and re-executes the loop of steps 8.02 through 8.30 as necessary.

Figure 9:
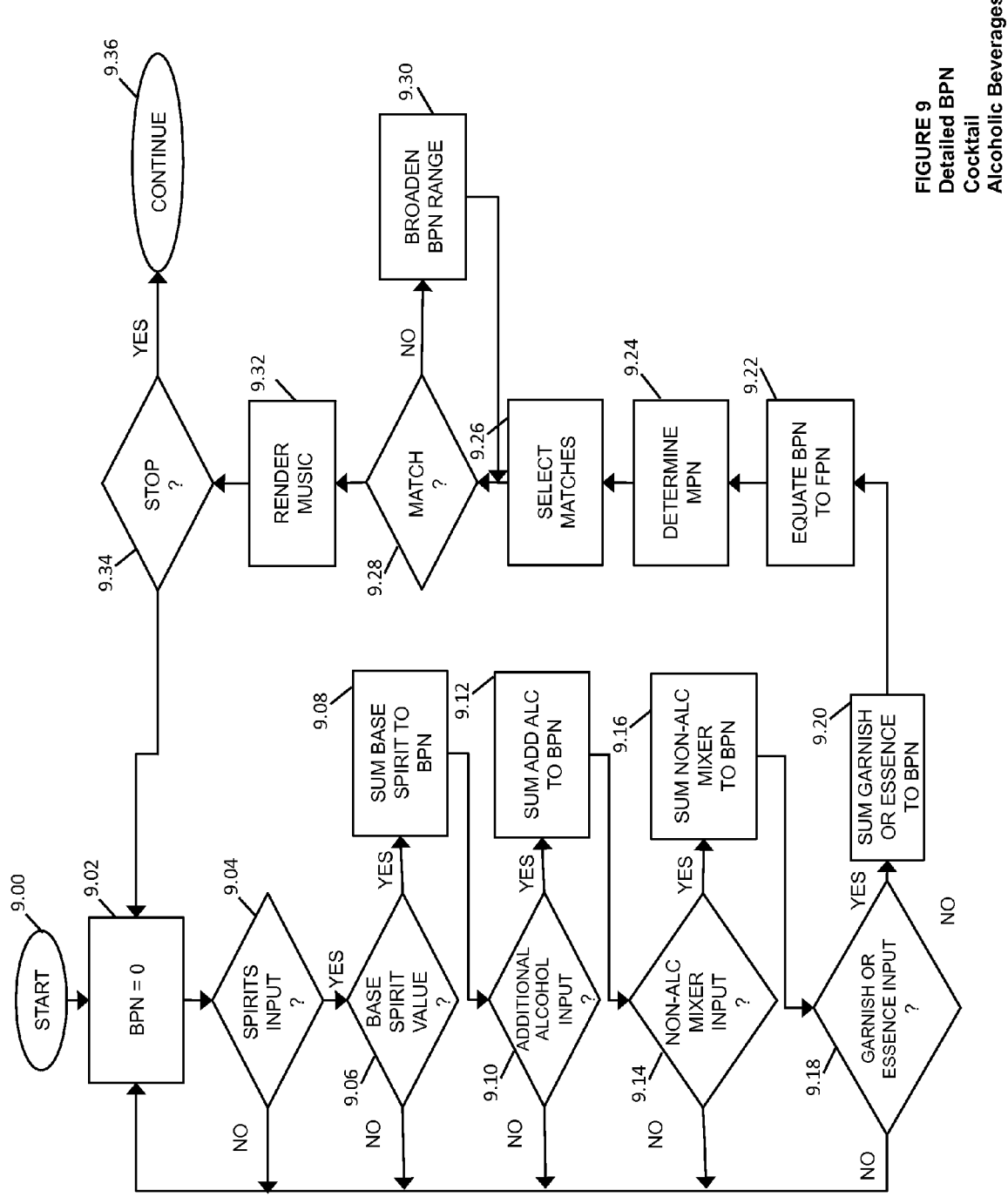
FIG. 9 is a flowchart of a further aspect of the invented method whereby the pairing device generates a beverage pairing number for a cocktail designation.

Referring now generally to the Figures, and particularly to FIG. 9, FIG. 9 is a flowchart of a yet further aspect of the invented method whereby a cocktail designation CTL.001-CTL.N is generated and summed to a BPN.001-BPN.N. In step 9.02 the pairing device 110 sets the beverage pairing number BPN.001 to 0. In step 9.04 the pairing device 110 determines whether a spirits designation SPIR.001 has been received. When the determination of step 9.04 is negative, the pairing device 110 returns to step 9.02 and resets the beverage pairing number BPN.001 to 0. In the alternative, when the determination in step 9.04 is positive, the pairing device 110 advances to step 9.06, wherein the pairing device 110 determines whether to generate the base spirit value SPIR.001, by means of the method of FIG. 8. When the pairing device 110 determines to generate the base spirit value SPIR.001 in step 9.06, the pairing device 110 sums the base spirit designation SPIR.001-SPIR.N to the beverage pairing number BPN.001 in step 9.08. When the determination in step 9.06 is negative, the pairing device 110 returns to step 9.02 and resets the beverage pairing number BPN.001 to 0. In step 9.10 the pairing device 110 determines whether an additional spirit designation MIX.001-MIX.N is present, i.e. if the cocktail designation CTL.001 contains multiple types of alcohol ALC.001-ALC.N. When the pairing device 110 determines in step 9.10 that an additional spirit designation MIX.001 is present, the pairing device 110 sums the additional spirit designation MIX.001 to the beverage pairing number BPN.001 in step 9.12. When the determination in step 9.10 is negative, the pairing device 110 returns to step 9.02 and resets the beverage pairing number BPN.001 to 0. In step 9.14 the pairing device 110 determines whether a non-alcoholic mixer designation NAM.001-NAM.N is detected. A non-alcoholic mixer NAM.001 may include, but is not limited to, water, fruit juice, milk and/or carbonated soft drinks; the numerical values associated with the non-alcoholic mixers NAM.001-NAM.N are based upon the previously determined numerical values associated the above-mentioned beverages, or with other possible non-alcoholic mixers NAM.001-NAM.N. When the pairing device 110 determines in step 9.14 that a non-alcoholic mixer NAM.001 is present, the pairing device 110 sums the non-alcoholic mixer NAM.001 to the beverage pairing number BPN.001 in step 9.16. When the determination in step 9.14 is negative, the pairing device 110 returns to step 9.02 and resets the beverage pairing number BPN.001 to 0. In step 9.18 the pairing device 110 determines whether a garnish or essence designation GRS.001-GRS.N is detected. A garnish or essence designation GRS.001 may include, but is not limited to fruit peel twists, extremely concentrated fruit or vegetable essences, and/or muddled fruit and/or vegetation; the numerical values associated with the garnish or essence designation GRS.001-GRS.N are based upon the previously determined numerical values associated the above-mentioned ingredients, or other reasonable alternative garnish or essence GRS.001. When the pairing device 110 determines in step 9.18 that a garnish or essence designation GRS.001 is present, the pairing device 110 sums the garnish or essence designation GRS.001 to the beverage pairing number BPN.001 in step 9.20. When the determination in step 9.18 is negative, the pairing device 110 returns to step 9.02 and resets the beverage pairing number BPN.001 to 0.

When all of the above-mentioned designations have been summed to the beverage pairing number BPN.001, the pairing device 110 sets the beverage pairing number BPN.001 generated the method of the current figure equal to the food pairing number FPN.001 generated through the method of FIG. 2. In step 9.24 the pairing device 110 determines a musical pairing number MPN.001 by means of the method of FIG. 1. The pairing device 110 subsequently selects musical records M.REC.001-M.REC.N with musical pairing numbers MPN.001-MPN.N having numerical values that approach or are equal to the numerical values of the designated food pairing number FPN.001 and the designated beverage pairing number BPN.001 in step 9.26. In step 9.28, the pairing device 110 determines whether the numerical values of the designated food pairing number FPN.001, the designated beverage pairing number BPN.001, and the musical record M.REC.001 associated with the musical pairing number MPN.001 are at least nearly identical. When the determination in step 9.28 is negative, the pairing device 110 proceeds to step 9.30, wherein the pairing device 110 broadens the range of numerical values associated with the beverage pairing number BPN.001. The pairing device 110 subsequently returns to step 9.28, and repeats the loop of steps 9.28 through 9.30 until the determination in step 9.28 is positive. When the determination in step 9.28 is positive, the pairing device 110 renders the musical record M.REC.001 associated with the musical pairing number MPN.001 in step 9.32. In step 9.34 the pairing device 110 determines whether to terminate the process. When the determination of step 9.34 is negative, the pairing device 110 re-executes the loop of steps 9.02 through 9.34 as necessary. In the alternative, when the determination of step 9.34 is positive, the pairing device 110 continues to alternate processes in step 9.36.

The method of FIG. 9 may be more easily comprehended by means of the following equation:

$$BPN = SPIR + MIX + NAM + GRS$$

where BPN represents the numerical value associated with the beverage pairing number for a designated cocktail, SPIR indicates the numerical value associated with a first spirits input, MIX indicates the numerical value associated with a second type of spirits mixer, NAM represents the numerical value associated with a non-alcoholic mixer, and GRS represents the numerical value associated with a garnish or essence.

Figure 10:
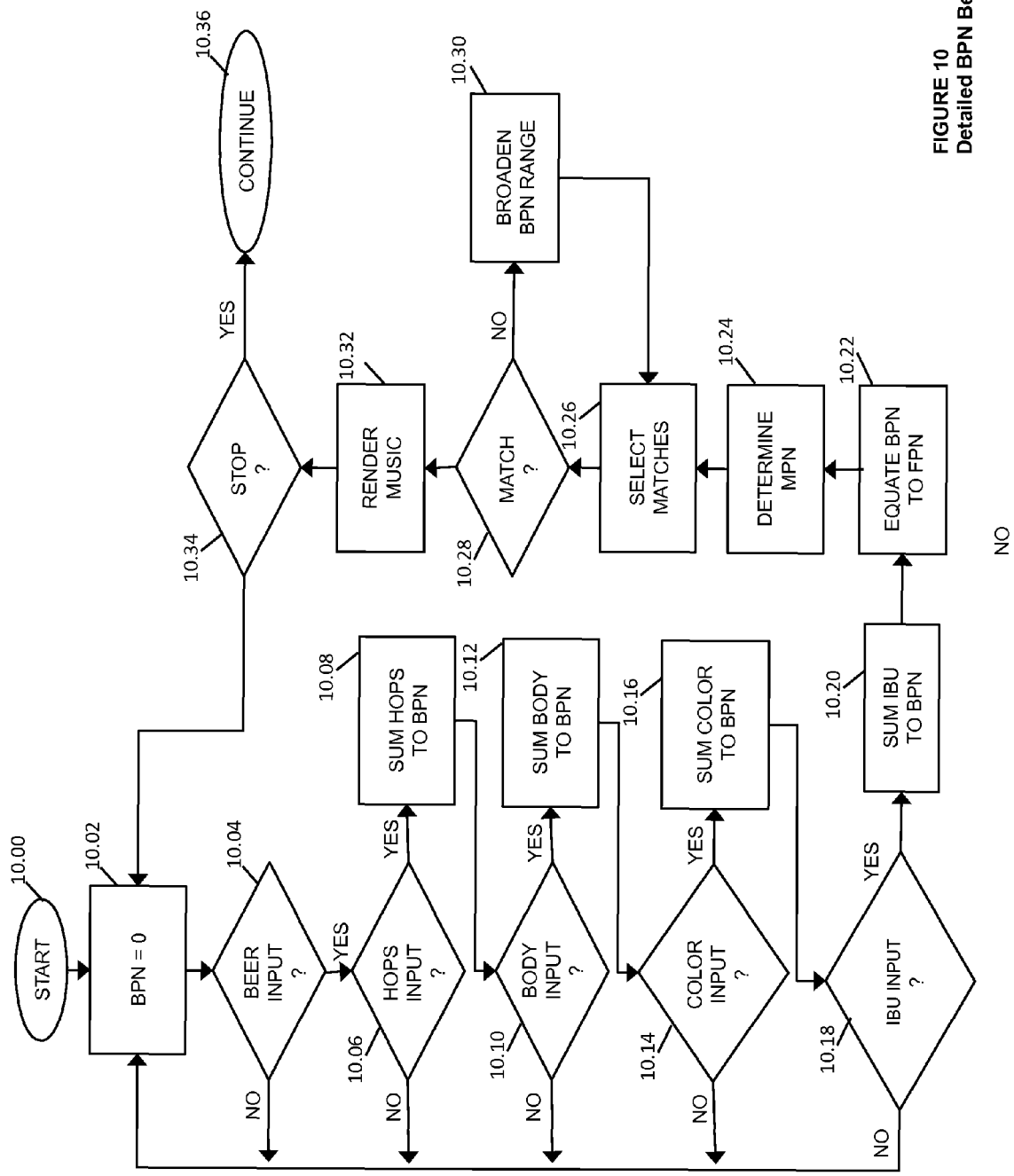
FIG. 10 is a flowchart of a yet additional aspect of the invented method whereby the pairing device determines a beverage pairing number for a beer designation.

Referring now generally to the Figures, and particularly to FIG. 10, FIG. 10 is a flowchart of a yet further aspect of the invented method whereby the pairing device 110 generates a detailed beverage pairing number BPN.001 using a beer designation BEER.001-BEER.N. In step 10.02 the pairing device 110 sets the beverage pairing number BPN.001 to 0. In step 10.04 the pairing device 110 determines whether a beer designation BEER.001 is detected. When the determination in step 10.04 is negative, the pairing device 110 returns to step 10.02 and resets the beverage pairing number BPN.001 to 0. When the determination in step 10.04 is positive, the pairing device 110 advances to step 10.06. In step 10.06 the pairing device 110 determines whether a hops designation HOP.001-HOP.N is detected. The hops designation HOP.001 is associated with the numerical values 1 through 5, 1 representing "not at all hoppy" and 5 representing "extremely hoppy." When a hops designation HOP.001 is detected, the pairing device 110 proceeds to step 10.08, wherein the pairing device 110 sums the hops designation HOP.001 to the beverage pairing number BPN.001. Alternatively, when the pairing device 110 does not detect a hops designation HOP.001, the pairing device 110 returns to step 10.02, and resets the beverage pairing number BPN.001 to 0. In step 10.10 the pairing device 110 determines whether a body designation BEER.BDY.001-BEER.BDY.N is detected. The body designation BEER.BDY.001 is associated with the numerical values 1 through 5, 1 representing "very weak" and 5 representing "very strong." When a body designation BEER.BDY.001 is detected in step 10.10, the pairing device 110 proceeds to step 10.12, wherein the pairing device 110 sums the body designation BEER.BDY.001 to the beverage pairing number BPN.001. Alternatively, when the pairing device 110 does not detect a body designation BEER.BDY.001 in step 10.10, the pairing device 110 returns to step 10.02, and resets the beverage pairing number BPN.001 to 0. In step 10.14 the pairing device 110 determines whether a color designation CLR.001-CLR.N is detected. The color designation CLR.001 is associated with the numerical values 1 through 5, 1 representing "very light" and 5 representing "very dark." When a color designation CLR.001 is detected in step 10.14, the pairing device 110 proceeds to step 10.16, wherein the pairing device 110 sums the color designation CLR.001 to the beverage pairing number BPN.001. Alternatively, when the pairing device 110 does not detect a color designation CLR.001 in step 10.14, the pairing device 110 returns to step 10.02, and resets the beverage pairing number BPN.001 to 0. In step 10.18 the pairing device 110 determines whether an international bitterness unit (based upon the globally recognized International Bitterness Units scale) designation IBU.001-IBU.N is detected. The international bitterness unit designation IBU.001 is associated with the numerical values 1 through 5, 1 representing "not at all bitter" and 5 representing "extremely bitter." When an international bitterness unit designation IBU.001 is detected in step 10.18, the pairing device 110 proceeds to step 10.20, wherein the pairing device 110 sums the international bitterness unit designation IBU.001 to the beverage pairing number BPN.001. Alternatively, when the pairing device 110 does not detect an international bitterness unit designation IBU.001 in step 10.18, the pairing device 110 returns to step 10.02, and resets the beverage pairing number BPN.001 to 0.

When all of the above-mentioned BEER.001-BEER.N designations have been summed to the beverage pairing number BPN.001, the pairing device 110 sets the beverage pairing number BPN.001 generated the method of the current Figure equal to the food pairing number FPN.001 generated through the method of FIG. 2 in step 10.22. In step 10.24 the pairing device 110 determines a musical pairing number MPN.001 by means of the method of FIG. 1. The pairing device 110 subsequently selects musical records M.REC.001-M.REC.N with musical pairing numbers MPN.001-MPN.N having numerical values that approach or are equal to the numerical values of the designated food pairing number FPN.001 and the designated beverage pairing number BPN.001 in step 10.26. In step 10.28, the pairing device 110 determines whether the numerical values of the designated food pairing number FPN.001, the designated beverage pairing number BPN.001, and the musical record M.REC.001 associated with the musical pairing number MPN.001 are at least approaching identical. When the determination in step 10.28 is negative, the pairing device 110 proceeds to step 10.30, wherein the pairing device 110 broadens the range of numerical values associated with the beverage pairing number BPN.001. The pairing device 110 subsequently returns to step 10.28, and repeats the loop of steps 10.28 through 10.30 until the determination in step 10.28 is positive. When the determination in step 10.28 is positive, the pairing device 110 renders the musical record M.REC.001 associated with the musical pairing number MPN.001 in step 10.32. In step 10.34 the pairing device 110 determines whether to terminate the process. When the determination of step 10.34 is negative, the pairing device 110 re-executes the loop of steps 10.02 through 10.34 as necessary. In the alternative, when the determination of step 10.34 is positive, the pairing device 110 continues to alternate processes in step 10.36.

The method of FIG. 10 may be more easily comprehended by means of the equation:

$$BPN=HOP+BEER.BDY+BEER.CLR+IBU$$

where BPN is the numerical value associated with the beverage pairing number for a designated beer input, HOP is the numerical value associated with a hoppiness designation, BEER.BDY is a the numerical value associated with body designation, BEER.CLR is a the numerical value associated with color designation, and IBU is a the numerical value associated with bitterness designation based upon the International Bitterness Units scale.

Figure 11:
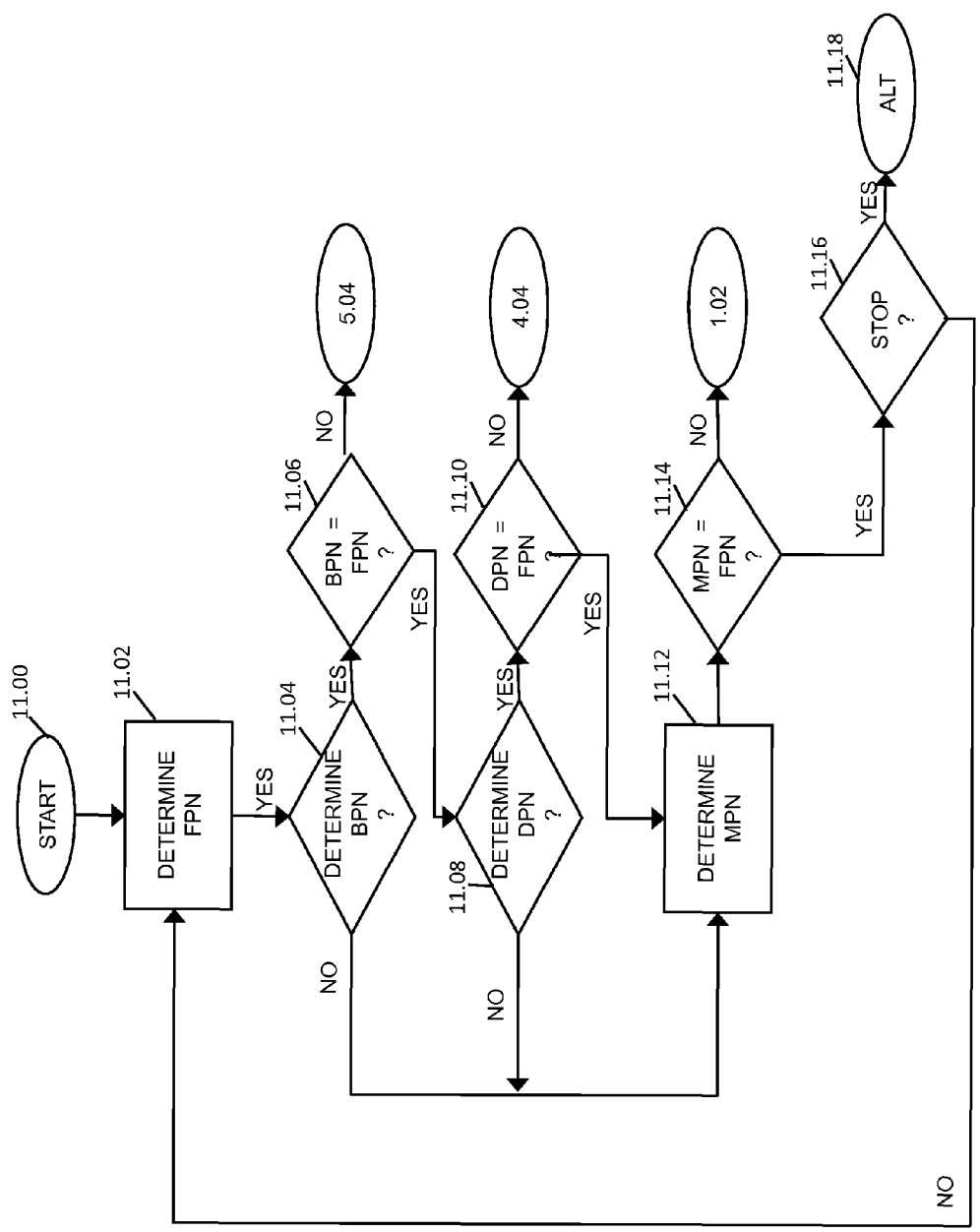
FIG. 11 is a flowchart of an additional aspect of the invented method whereby the pairing device determines whether the musical pairing number, the food pairing number, the beverage pairing number and the dessert pairing number are identical.

Referring now generally to the Figures and particularly to FIG. 11, FIG. 11 is a flowchart of an additional aspect of the invented method whereby the pairing device 110 determines the equivalence of the food pairing number FPN.001, the beverage pairing number BPN.001, the dessert pairing number DPN.001 and the musical pairing number MPN.001. In the preferred implementation of the invented method, the above values are substantively equivalent; in another format, the ideal implementation of the invented methods is:

$$FPN=BPN=DPN=MPN$$

In step 10.02 the pairing device 110 generates a food pairing number FPN.001 by means of steps 2.04 through 2.24 of the method of FIG. 2. In step 10.04 the pairing device 110 determines whether to generate a beverage pairing number BPN.001 using steps 5.04 through 5.24 of the method of FIG. 5, and/or steps 6.02 through 6.24 of the method of FIG. 6 and/or steps 7.02 through 7.22 of the method of FIG. 7 and/or steps 8.04 through 8.20 of the method of FIG. 8, and/or steps 9.04 through 9.20 of the method of FIG. 9, and/or steps 10.04 through 10.20 of the method of FIG. 10. When the determination in step 11.04 is positive, the pairing device 110 advances to step 11.06, wherein the pairing device 110 determines whether the food pairing number FPN.001 and the beverage pairing number BPN.001 are equal. If the determination in step 11.06 is negative, the pairing device 110 returns to step 5.04 of the method of FIG. 5. Alternatively, when the determination in step 11.06 is positive, the pairing device 110 advances to step 11.08. In the alternative, when the determination in step 11.04 is negative, the pairing device 110 may optionally advance directly to step 11.12, wherein the musical pairing number MPN.001 is determined.

In step 11.08 the pairing device 110 derives the dessert pairing number DPN.001, using steps 4.04 through 4.24 of the method of FIG. 4. When the pairing device 110 has calculated the dessert pairing number DPN.001, the pairing device 110 compares the dessert pairing number DPN.001 and the food pairing number FPN.001 in step 11.10. If the pairing device 110 in step 11.10 determines that the food pairing number FPN.001 and the dessert pairing number DPN.001 are not equivalent, the pairing device 110 proceeds to step 4.04 of the method of FIG. 4. In the alternative, the pairing device 110, when the determination in step 11.08 is negative, may optionally proceed directly to step 11.12. When the determination in step 11.10 is positive, or alternatively when the determination in either step 11.04 or step 11.08 is negative, the pairing device 110 advances to step 11.12, wherein a musical pairing number MPN.001 is determined my means of steps 1.02 through 1.24 of the method of FIG. 1. The pairing device 110 then compares the musical pairing number MPN.001 and the food pairing number FPN.001 in step 11.14. If the pairing device 110 determines in step 11.14 that the music pairing number MPN.001 and the food pairing number FPN.001 are not identical, the pairing device 110 proceeds to step 1.02 of the method of FIG. 1. Alternatively, if the determination in step 11.14 is positive, the pairing device 110 proceeds to step 11.16, wherein the determination is made to terminate the process. When the pairing device 110 determines to terminate the process, the pairing device 110 proceeds to step 11.18, wherein alternate processes are executed. When the determination in step 11.16 is negative, the pairing device 110 returns to step 11.02 and executes the loop of steps 11.02 through 11.16 as necessary.

Figure 12:
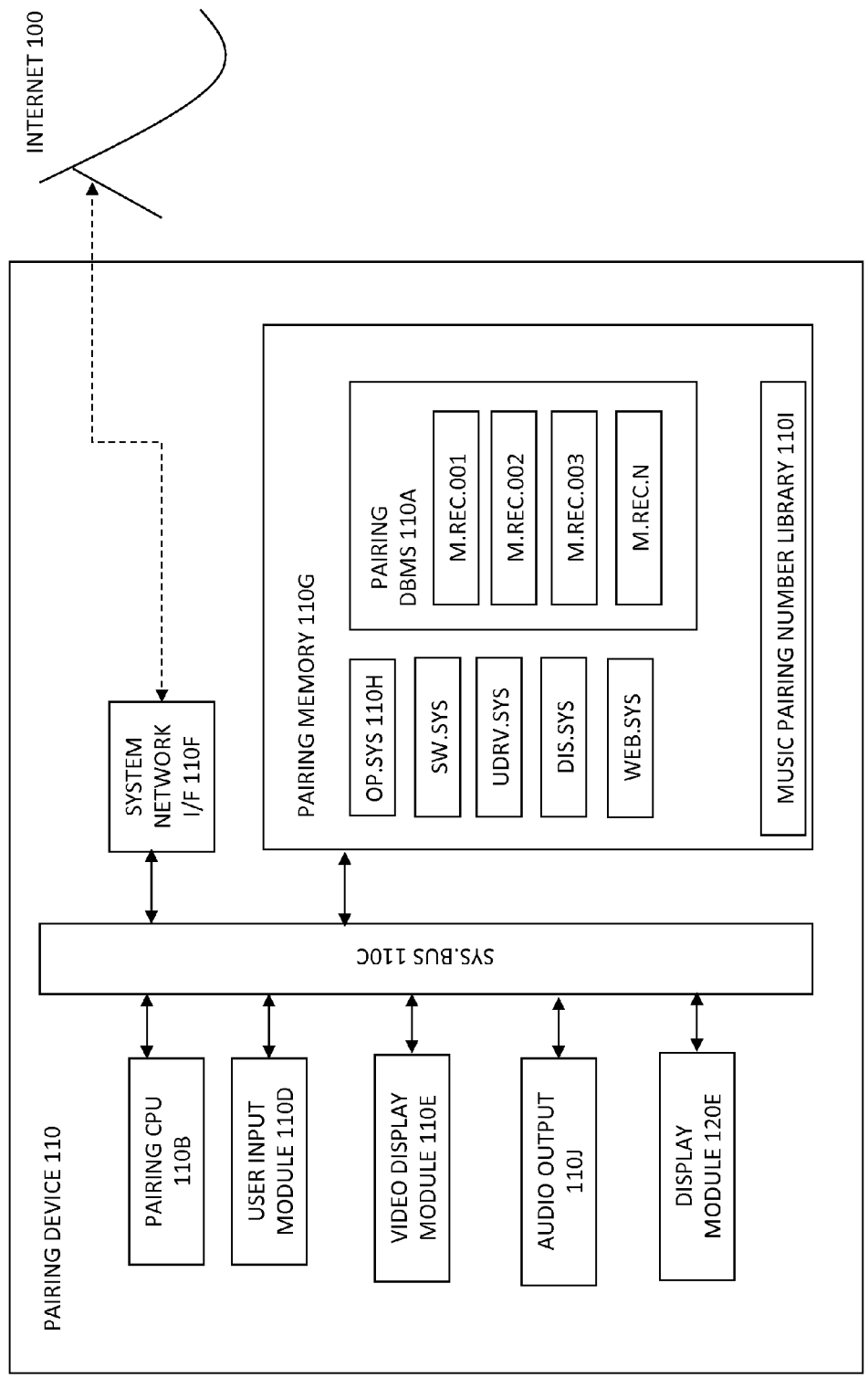
FIG. 12 is a block diagram of the pairing device.

Referring now generally to the Figures and particularly to FIG. 12, FIG. 12 is a block diagram of the pairing device 110. The pairing device 110 may be or comprise (a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, VISTA™ or WINDOWS 7 ™ operating system marketed by Microsoft Corporation of Redmond, Wash.; (d.) a MACBOOK PRO™ personal computer as marketed by Apple, Inc. of Cupertino, Calif.; (e.) an IPAD™ tablet computer as marketed by Apple, Inc. of Cupertino, Calif.; (f.) a TOUGHPAD™ tablet computer as marketed by Panasonic Corporation of Kadoma, Osaka, Japan and running an ANDROID™ operating system as marketed by Google, Inc. of Mountain View, Calif.; (h.) an IPHONE™ digital cellular telephone marketed by Apple, Inc. of Cupertino, Calif. or (h.) other suitable smart phone, tablet computer, computational system, and/or electronic communications device known in the art.

A pairing device operating system software OP.SYS 110H of the pairing device 110 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS XP™, VISTA™ or WINDOWS 7 ™ operating system as marketed by Microsoft Corporation of Redmond, Wash.; or the MAC OS X operating system or iPhone G4 OS™ as marketed by Apple, Inc. of Cupertino, Calif.

The pairing device 110 further comprises a software bus SYS.BUS 110C. The software bust SYS.BUS 110C connects and facilitates communication between, a pairing CPU 110B, a user input module 110D, a video display module 110E, an optional local network I/F 110F which optionally allows the pairing device 110 to connect to the Internet 100 for the purpose of accessing musical records M.REC.001-M.REC.N stored outside of the pairing device database management system DBMS 110A, optionally in a software cloud. The pairing device 110 also includes a local database memory 110G. The pairing device memory 110G comprises a pairing device operating system OP.SYS 110H, a pairing device database software SW.SYS, a pairing device user input module driver UDRV.SYS, a pairing device display driver DIS.SYS, and a pairing device interface driver NIF- .SYS. The pairing device system memory also comprises a music pairing number library 110I, from which the pairing device 110 may draw music pairing numbers MPN.001-MPN.N according to criteria listed in the method of FIG. 2. The pairing device system memory 110G further comprises a pairing device database management system ("DBMS") 110A. The pairing device DBMS 110A includes a plurality of musical records M.REC.001-M.REC.N, which the pairing device 110 may optionally choose based upon a musical pairing number MPN.001-MPN.N derived from the method of FIG. 1.

Figure 13A:
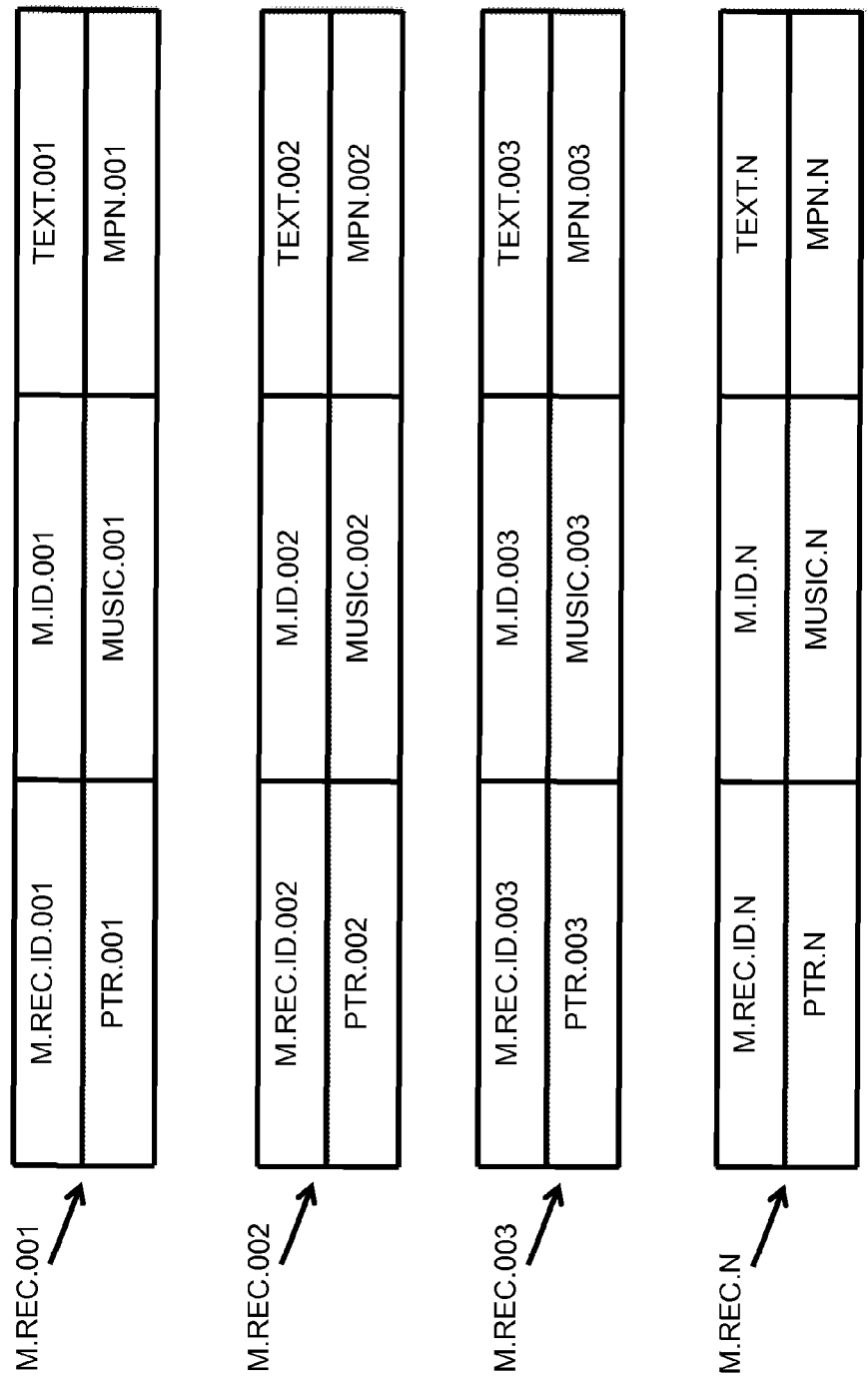
FIG. 13A is a block diagram of the musical recordings of FIG. 11.

Referring now generally to the Figures and particularly to FIG. 13A, FIG. 13A is a block diagram of the musical records M.REC.001-M.REC.N of the pairing DBMS 110A of FIG. 12. The first musical record M.REC.001 contains: (a.) a first musical record identifier M.REC.ID.001, which allows the pairing device 110 to identify a musical record based upon optional included metadata; (b.) a first music identifier M.ID.001, allowing the pairing device to identify a particular digital musical recording; (c.) a first text identifier of the musical recording TEXT.001, allowing an optional display by the pairing device 110 of the musical record information to a user; (d.) a first pointer to the musical recording PTR.001, by which the pairing device 110 retrieves a particular digital musical recording; (e.) a first digital music file MUSIC.001, which may be rendered by the pairing device 110 for listening by a user; and (f.) a first musical pairing number MPN.001, which may be paired to a first food pairing number FPN.001. The musical records M.REC.002-M.REC.N further include (a.) the musical record identifiers M.REC.ID.002-M.REC.ID.N, (b.) The music identifiers M.ID.002-M.ID.N, (c.) the text identifiers of the musical recordings TEXT.002-TEXT.N, (d.) the pointers to the musical recordings PTR.002-PTR.N, (e.) the music files MUSIC.002-MUSIC.N, and (f.) the musical pairing numbers MPN.002-MPN.N.

Referring now generally to the Figures and particularly to FIG. 13B, FIG. 13B is a block diagram of the music pairing number library (hereinafter "MPN library") 110I of FIG. 12. The MPN library 110I contains a plurality of optional musical pairing numbers MPN.001-MPN.N for identification and rendering by the pairing device 110. The MPN library 110I allows the pairing device 110 to locally determine and designate a plurality of musical pairing numbers MPN.001-MPN.N to the food pairing numbers FPN.001-FPN.N. The MPN library 110I comprises: (a.) a first musical pairing number identifier MPN.ID.001, by which the pairing device 110 may retrieve (b.) a designated first musical pairing number MPN.001; (c.) the first music identifier M.ID.001, allowing the pairing device to identify a particular digital musical recording; and (d.) the first musical record identifier M.REC.ID.001, which allows the pairing device 110 to identify a musical record based upon optional included metadata. The MPN library 110I further comprises (a.) a plurality of musical pairing number identifiers MPN.ID.002-MPN.ID.N; (b.) a plurality of musical pairing numbers MPN.002-MPN.N; (c.) a plurality of music identifiers M.ID.002-M.ID.N; and (d.) a plurality of musical record identifiers M.REC.ID.002-M.REC.ID.N.

Figure 13C:
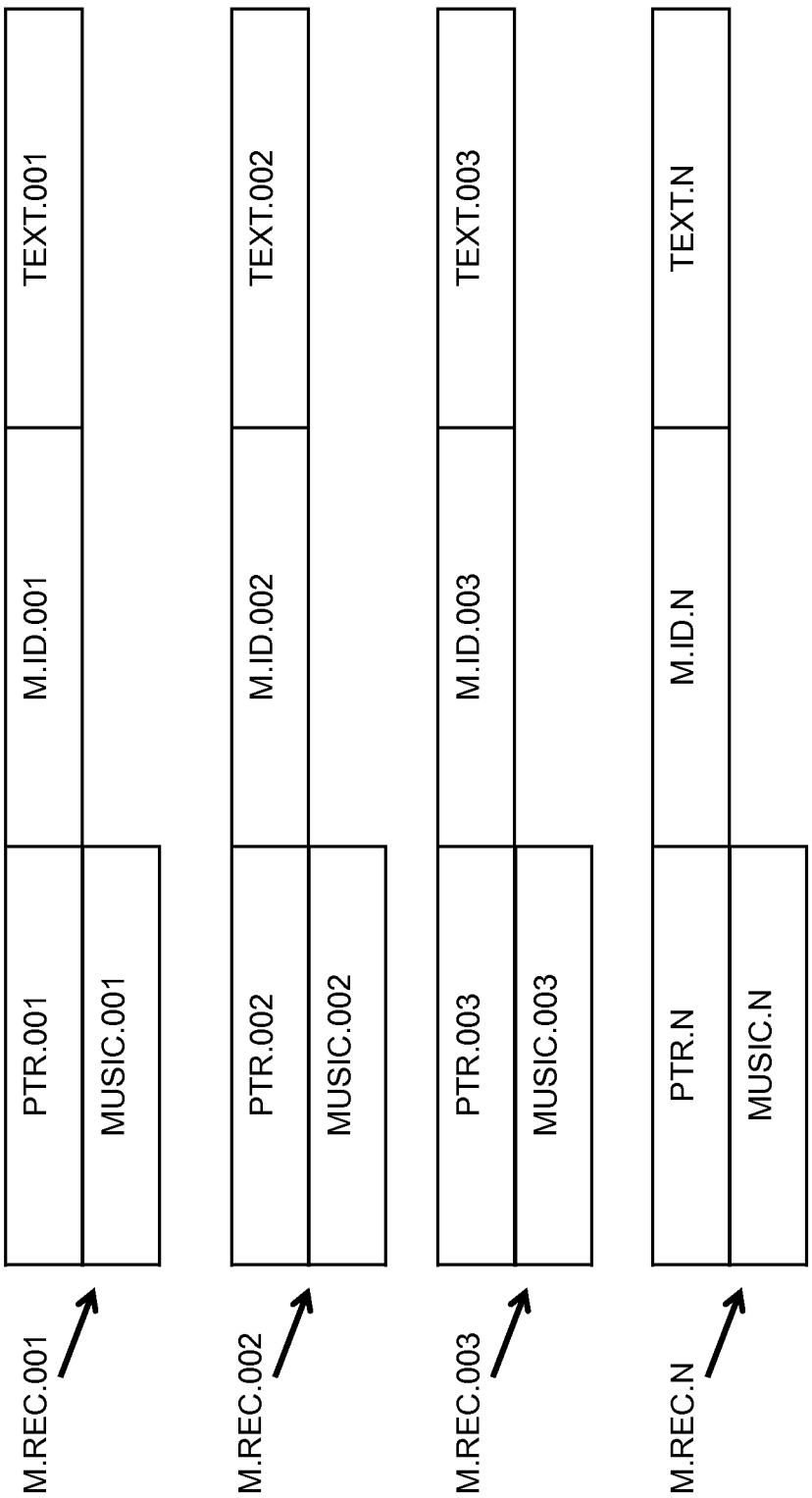
FIG. 13C is a block diagram of off-device storage of musical records.

Referring now generally to the Figures and particularly to FIG. 13C, FIG. 13C is a block diagram of off-device storage of musical records M.REC.001-M.REC.N. A first off-device musical record M.REC.001 comprises: (a.) the first pointer to the off-device musical record PTR.001 by which the musical record M.REC.001 may be retrieved by the pairing device 110; (b.) the first digital music recording identifier of the off-device musical record M.ID.001, by which a designated digital music recording may be identified; (c.) the first text identifier of the off-device musical record TEXT.001 by which a designated musical record may be visually identified by a user; and (d.) the first off-device digital musical recording MUSIC.001, which may be retrieved and rendered by the pairing device 110. The plurality of further off-device storage of musical records M.REC.002-M.REC.N comprise (a.) the pointers to the off-device musical record PTR.002-PTR.N; (b.) the music identifiers of the off-device musical record M.ID.002-M.ID.N; (c.) the text identifiers of the off-device musical record TEXT.002-TEXT.N; and (d.) the off-device digital musical recordings MUSIC.002-MUSIC.N.

Figure 14:
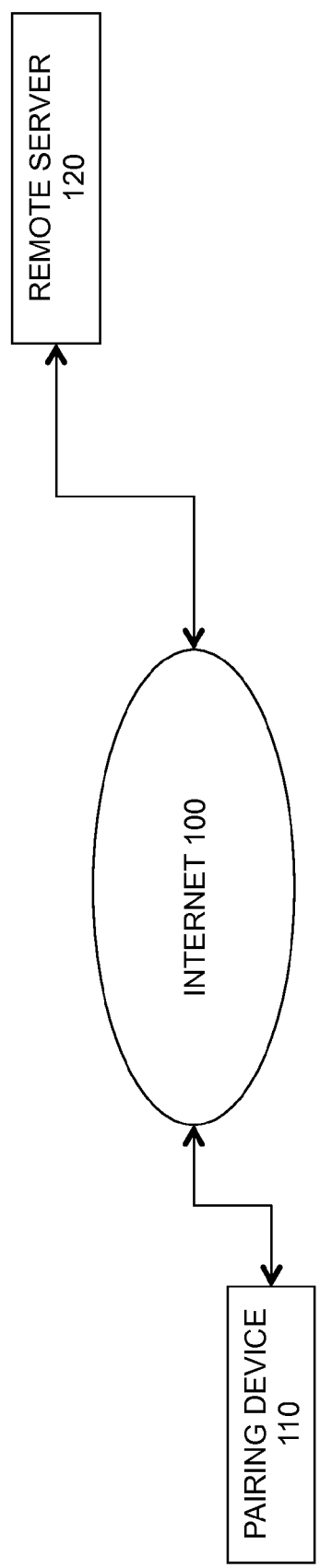
FIG. 14 is a network diagram comprising the pairing device, the Internet and a remote server.

Referring now generally to the Figures, and particularly to FIG. 14, FIG. 14 is a diagram of a network comprising the pairing device 110, the Internet 100, and a remote server 120. The pairing device 110 may bi-directionally communicate and transfer data with the remote server 120 via the internet 100 by suitable electronic communications messaging protocols and methods known in the art including, but not limited to, Simple Object Access Protocol, Representational State Transfer, and/or a webservice adapted to conform with the architecture and structure of the World Wide Web.

Figure 15:
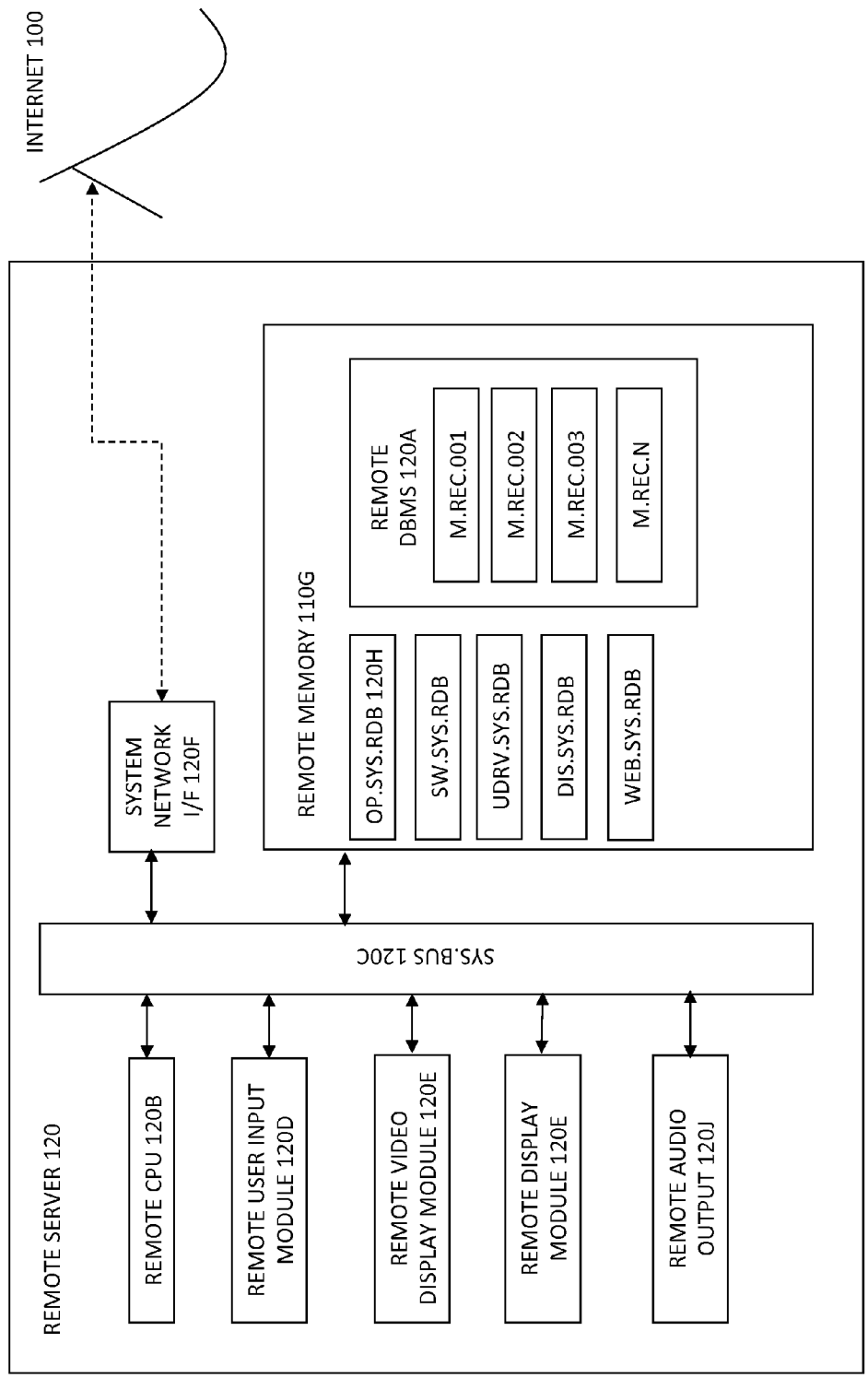
FIG. 15 is a block diagram of the remote server of FIG. 13.

Referring now generally to the Figures, and particularly to FIG. 15, FIG. 15 is a block diagram of the remote server 120. The remote server 120 may be or comprise a software and hardware bundled computer product such as (a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, VISTA™ or WINDOWS 7 ™ operating system marketed by Microsoft Corporation of Redmond, Wash.; (d.) a MACBOOK PRO™ personal computer as marketed by Apple, Inc. of Cupertino, Calif.; (e.) an IPAD™ tablet computer as marketed by Apple, Inc. of Cupertino, Calif.; (f.) a TOUGHPAD™ tablet computer as marketed by Panasonic Corporation of Kadoma, Osaka, Japan and running an ANDROID™ operating system as marketed by Google, Inc. of Mountain View, Calif.; (h.) an IPHONE™ digital cellular telephone marketed by Apple, Inc. of Cupertino, Calif. or (h.) other suitable smart phone, tablet computer, computational system, and/or electronic communications device known in the art.

A remote operating system software OP.SYS.RDB 120H of the remote server 120 may be selected from freely available, open source and/or commercially available operating system software, to include but not limited to a LINUX™ or UNIX™ or derivative operating system, such as the DEBIAN™ operating system software as provided by Software in the Public Interest, Inc. of Indianapolis, Ind.; a WINDOWS XP™, VISTA™ or WINDOWS 7 ™ operating system as marketed by Microsoft Corporation of Redmond, Wash.; or the MAC OS X operating system or iPhone G4 OS™ as marketed by Apple, Inc. of Cupertino, Calif.

The remote server 120 further comprises a software bus SYS.BUS.RDB 120C. The software bust SYS.BUS.RDB 120C connects and facilitates communication between, a remote CPU.RDB 120B, a remote user input module 120D, a video display module 120E, an optional remote network I/F 120F which optionally allows the remote server 120 to connect to the Internet 100 for the purpose of accessing musical records M.REC.001-M.REC.N stored outside of the pairing device database management system DBMS 110A, optionally in a software cloud The remote server 120 also includes a local database memory 120G. The local server memory 120G comprises a remote server operating system OP.SYS.RDB 120H, a remote server database software SW.SYS,RDB, a remote server user input module driver UDRV.SYS.RDB, a remote server display driver DIS.SYS-.RDB, and a remote server interface driver NIF.SYS.RDB. The remote server system memory 120G further comprises a remote server database management system ("DBMS") 120A. The remote server DBMS 120A includes a plurality of musical records M.REC.001-M.REC.N, which the remote server 120 may optionally designated and transfer to the pairing device 110.

Figure 16:
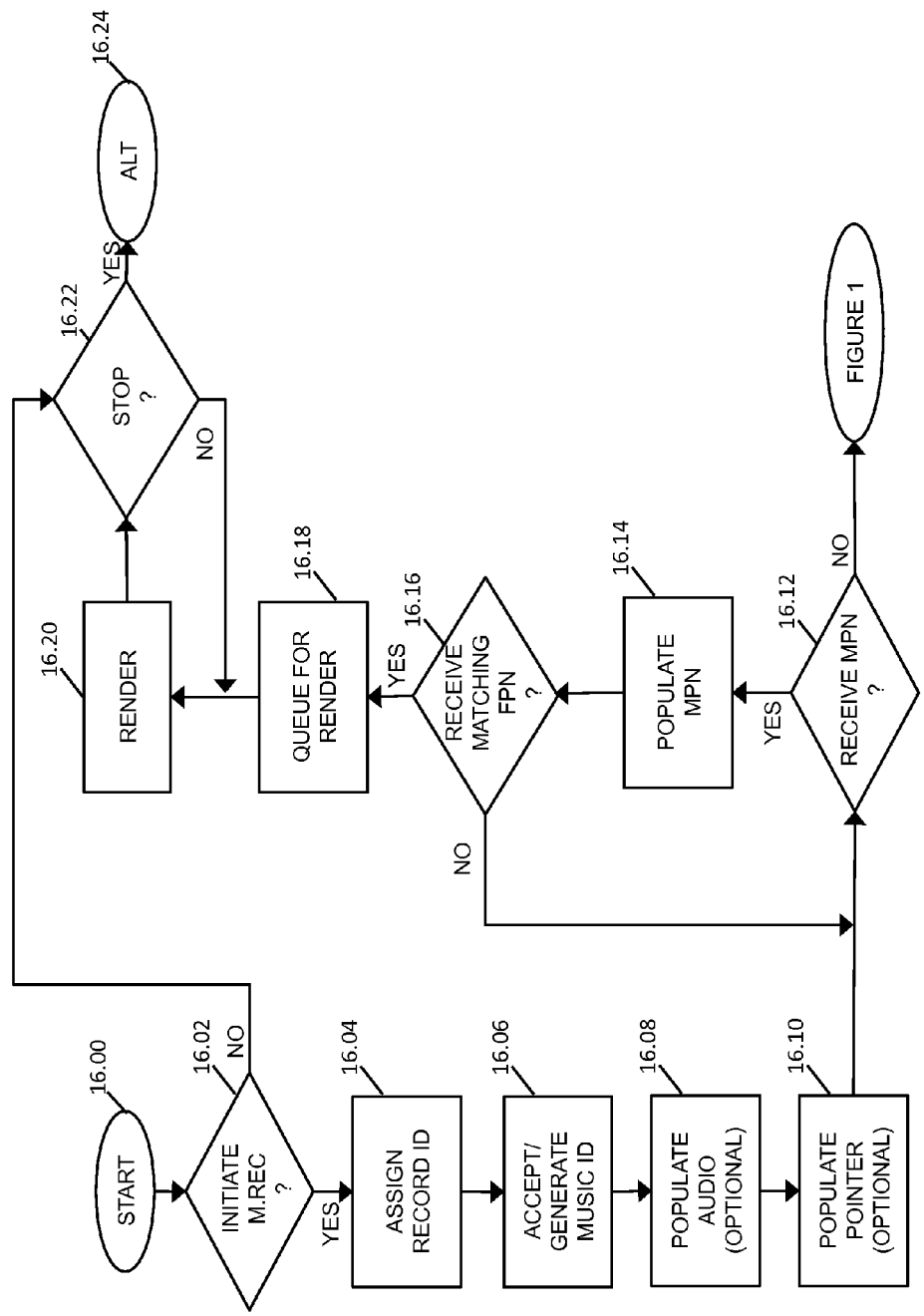
FIG. 16 is a flowchart of an aspect of the invented method whereby the pairing device initiates, populates and renders a musical record.

Referring now generally to the Figures, and particularly to FIG. 16, FIG. 16 is a flowchart of an aspect of the invented method whereby the pairing device 110 creates, populates and renders a musical record M.REC.001. In step 16.02 the pairing device 110 determines whether to initiate the musical record M.REC.001. When the pairing device 110 determines in step 16.02 not to initiate the musical record M.REC.001, the pairing device proceeds to step 16.22, wherein the pairing device 110 determines whether to terminate the current process. When the pairing device 110 determines to terminate the process, the pairing device 110 executes alternate processes. In the alternative, when the pairing device 110 determines in step 16.02 to initiate the musical record M.REC.001, the pairing device 110 advances to step 16.04. In step 16.04 the pairing device 110 assigns a musical record identifier M.REC.ID.001 to the initiated musical record M.REC.001. In step 16.06 the pairing device 110 accepts a music identifier M.ID.001 from the pairing DBMS 110A of FIG. 12, or, alternatively the pairing device 110 generates a music identifier M.ID.001. In optional step 16.08 the pairing device 110 populates initiated musical record M.REC.001 with digital audio recording MUSIC.001. In a further optional step 16.10 the pairing device 110 may optionally populate the initiated musical record M.REC.001 with a pointer PTR.001 to the musical record M.REC.001. In step 16.12 the pairing device 110 determines whether a musical pairing number MPN.001 has been received. When the pairing device 110 determines in step 16.12 that a musical pairing number MPN.001 has not been received, i.e. when the determination in step 16.12 is negative, the pairing device 110 executes the method of FIG. 1. When the determination in step 16.12 is positive, the pairing device 110 advances to step 5.14, wherein the MPN.001 received in step 16.12 is populated to the musical record M.REC.001. In step 16.16 the pairing device 110 determines whether a food pairing number FPN.001 matching the designated MPN.001 has been received. When the determination in step 16.16 is negative, the pairing device 110 returns to step 16.12 and re-executes the loop of steps 16.12 through 16.16 until the determination in step 16.16 is positive. When the determination in step 16.16 is positive, the pairing device 110 in step 16.18 queues the musical record M.REC.001 associated with the designated MPN.001 for eventual rendering. In step 16.20 the pairing device 110 renders the musical record M.REC.001. In step 16.22 the pairing device 110 determines whether to terminate the process. When the determination in step 16.20 is negative, the pairing device 110 returns to step 16.20, ad re-executes the loop of steps 16.20 through 16.22 as necessary. Alternatively, when the determination in step 16.20 is positive, the pairing device 110 proceeds to step 16.24, wherein the pairing device 110 executes alternate processes.

Figure 17:
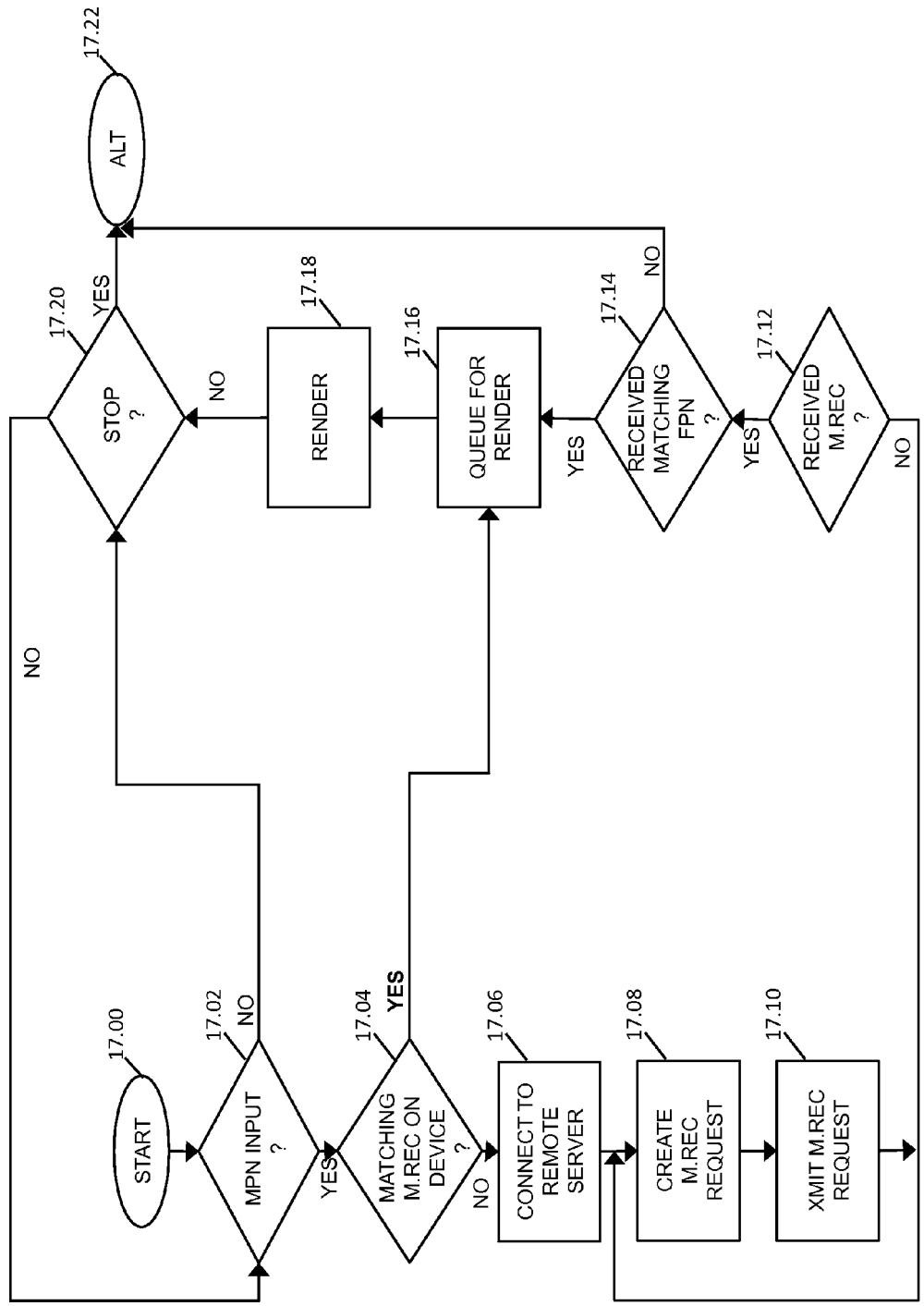
FIG. 17 is a flowchart of a further aspect of the invented method whereby the pairing device requests a musical record from the remote server.

Referring now generally to the Figures, and particularly to FIG. 17, FIG. 17 is a flowchart of a further aspect of the invented method whereby the pairing device 110 requests a musical record M.REC.001 from the remote server 120. In step 17.02 the pairing device 110 determines whether a musical pairing number MPN.001 input has been received. When a musical pairing number MPN.001 input has not been received, the pairing device 110 proceeds to step 17.20, wherein the pairing device 110 determines whether to terminate the process. Alternatively, when the pairing device 110 determines in step 17.02 that a musical pairing number MPN.001 has been received, the pairing device 110 advances to step 17.04, wherein the pairing device 110 determines whether a musical record M.REC.N is present on the device with a musical pairing number MPN.N matching the inputted musical pairing number MPN.001. When the determination in step 17.04 is positive, the pairing device 110 advances directly to step 66.16, wherein the pairing device 110 queues the musical record M.REC.N for rendering. In the alternative, when the determination in step 17.04 is negative, the pairing device advances to step 17.06. In step 17.06 the pairing device 110 connects via the Internet 100 with the remote server 120. In step 17.08 the pairing device creates a musical record M.REC.001 request message for transmission to the remote server 120. In step 17.10 the pairing device 110 transmits the musical record M.REC.001 request message to the remote server 120. In step 17.12 the pairing device 110 determines whether the requested musical recording M.REC.001 has been received. When the determination in step 17.12 is negative, the pairing device 110 returns to step 17.08, and re-executes the loop of steps 17.08 through 17.12, until the determination in step 17.12 is positive, and the musical record M.REC.001 has been received. Alternatively, when the determination in step 17.12 is positive, the pairing device proceeds to step 17.14, wherein the pairing device 110 determines whether a food pairing number FPN.001 matching the musical pairing number MPN.001 of step 17.02 has been received. When the determination in step 17.14 is negative, the pairing device 110 advances to step 17.20, wherein the pairing device 110 determines whether to terminate the process. In the alternative, when the determination in step 17.14 is positive, the pairing device 110 advances to step 17.16 wherein the received musical record M.REC.001 is queued for rendering by the pairing device 110. In step 17.18 the pairing device 110 renders the received musical record M.REC.001. In step 17.20 the pairing device 110 determines whether to terminate the process. When the determination in step 17.20 is negative, the pairing device 110 returns to step 17.02 and re-executes the loop of steps 17.02 through 17.20 as necessary. Alternatively, when the determination in step 17.20 is positive, the pairing device 110 executes alternate processes in step 17.22.

Figure 18:
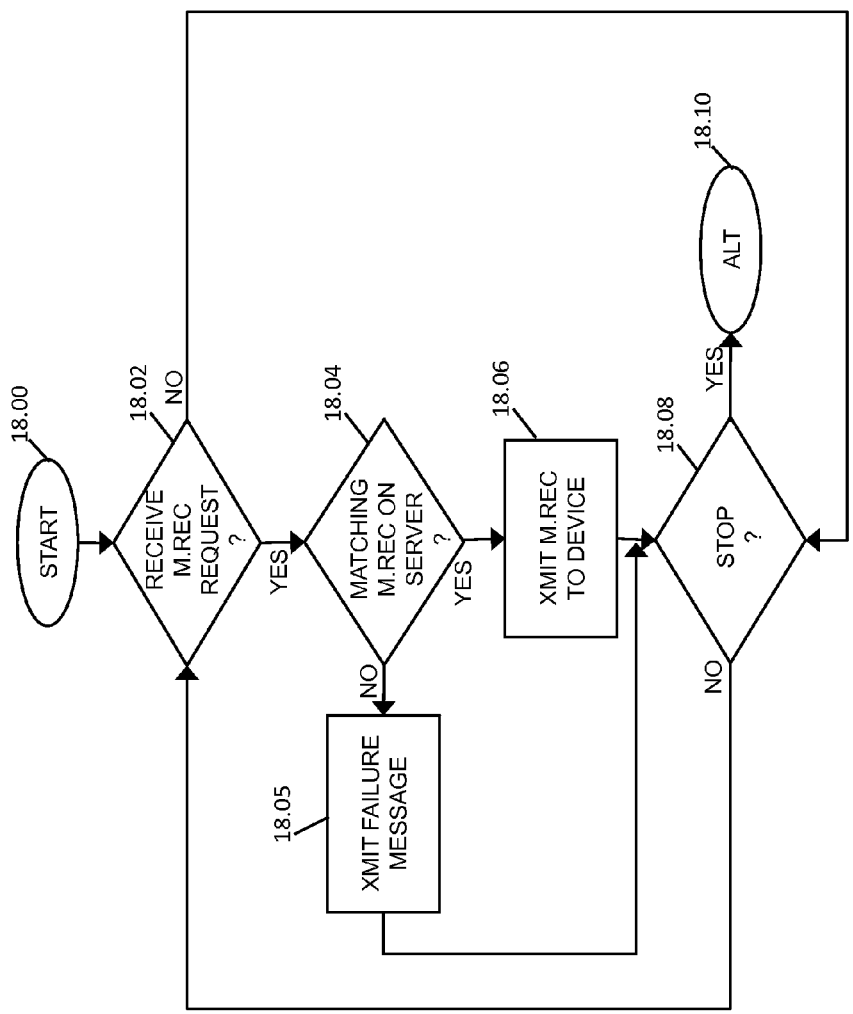
FIG. 18 is a flowchart of a yet further aspect of the invented method whereby the remote server transmits a musical record to the pairing device.

Referring now generally to the Figures, and particularly to FIG. 18, FIG. 18 is a flowchart of a yet additional aspect of the invented method whereby the remote server 120 receives a request for a musical record M.REC.001 from the pairing device 110, and transmits the musical record M.REC.001 to the pairing device 110. In step 18.02, the remote server 120 determines whether a request for a musical record M.REC.001 has been received. When the determination in step 18.02 is negative, the remote server 120 proceeds to step 18.08, wherein the remote server 120 determines whether to terminate the process. In the alternative, when the determination in step 18.02 is positive, i.e. the remote server 120 has received a request for a musical recording M.REC.001, the remote server 120 advances to step 18.04.

In step 18.04 the remote server 120 determines whether the requested musical record M.REC.001 is present on the remote server 120. When the remote server 120 determines in step 18.04 that the requested musical record M.REC.001 is not present, the remote server 120 proceeds to step 18.05, wherein the remote server 120 transmits a failure message to the pairing device 110. From step 18.05, the remote server 120 advances to step 18.08, wherein the remote server 120 determines whether to terminate the process. Alternatively, when the determination in step 18.04 is positive, and the remote server 120 is able to find a matching musical record M.REC.001, the remote server 120 transmits the musical record M.REC.001 to the pairing device 110 in step 18.06. In step 18.08 the remote server 120 determines whether to terminate the current process. When the determination in step 18.08 is negative, the remote server 120 returns to step 18.02 and re-executes the loop of steps 18.02 through 18.08 as necessary. Alternatively, when the determination in step 18.08 is positive, the remote server 120 executes alternate processes in step 18.10.

Figure 19:
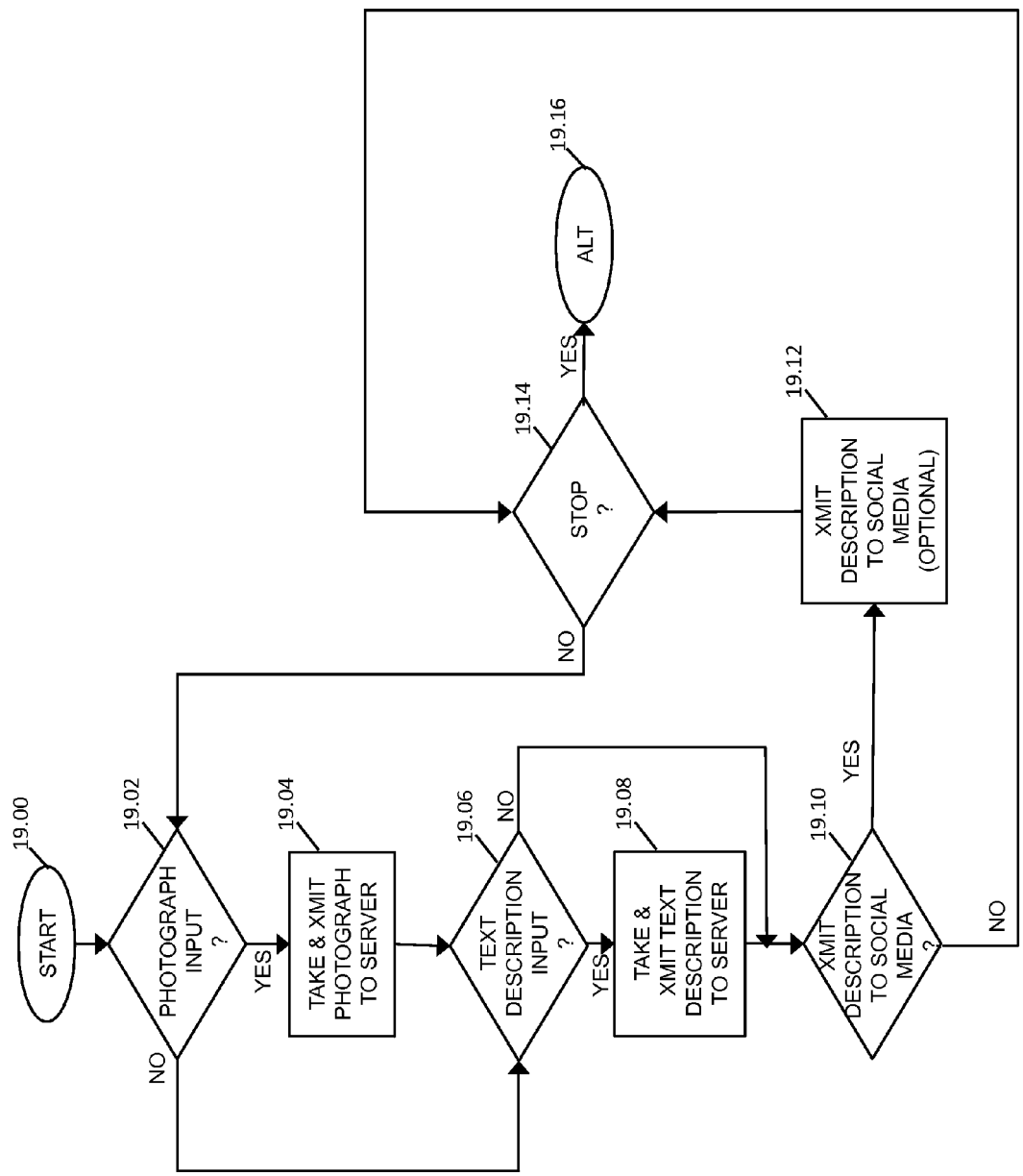
FIG. 19 is a flowchart of a yet additional aspect of the invented method whereby the pairing device takes photograph and text descriptions, and transmits the descriptions to the remote server and, optionally, to social media.

Referring now generally to the Figures, and particularly to FIG. 19, FIG. 19 is a flowchart of yet additional aspect of the invented method whereby the pairing device 110 takes photographic and/or text documentation of an exemplary first food FOOD.001, an exemplary first beverage BEV.001, and/or an exemplary first dessert DES.001, and transmits the photographic description PHT.DESC.001 and/or the text description TXT.DESC.001, along with a designated musical record identification M.REC.ID.001 to the remote server 120 and/or a social media platform. In step 19.02 the pairing device 110 determines whether a photographic description PHT.DESC.001 shall be taken. When the determination in step 19.02 is positive, the pairing device 110 proceeds to step 19.04 wherein the photographic description PHT.DESC.001 is taken, and is transmitted to the remote server 120 via the Internet 100. Alternatively, when the determination in step 19.02 is negative, or upon the completion of step 19.04, the pairing device 110 proceeds to step 19.06. In step 19.06 the pairing device 110 determines whether a text description TXT.DESC.001 of the designated FOOD.001 and/or BEV.001 and/or dessert DES.001 shall be taken. When the determination in step 19.08 is positive, the pairing device 110 takes and transmits the text description of the designated FOOD.001 and/or BEV.001 and/or dessert DES.001, and transmits the text description TXT.DESC.001, along with the designated musical record identification M.REC.ID.001 having the matching musical pairing number MPN.001, to the remote server 120 via the Internet 100. In the alternative, when the determination in step 19.06 is negative, or upon completion of step 19.08, the pairing device 110 advances to the optional step 19.10, wherein the pairing device 110 determines whether to transmit the text description TXT.DESC.001 and the photographic description PHT.DESC.001 to a social media platform. When the determination in optional step 19.10 is positive, the pairing device 110 advances to optional step 19.12, wherein the pairing device 110 optionally transmits the text description TXT.DESC.001 and the photographic description PHT.DESC.001, along with the designated musical record identification M.REC.ID.001 having the matching musical pairing number MPN.001, to the social media platform via the Internet 100. Alternatively, when the determination in step 19.10 is negative, or upon completion of step 19.12, the pairing device 110 advances to step 19.14, wherein the pairing device 110 determines whether to terminate the process. When the determination in step 19.14 is negative, the pairing device returns to step 19.02, and re-executes the loop of steps 19.02 through 19.14 as necessary. When the determination in step 19.14 is negative, the pairing device 110 executes alternate processes in step 19.16.

Figure 20A:
FIG. 20A is a block diagram of an exemplary musical record request message transmitted to the remote server by the local server.

Referring now generally to the Figures, and particularly to FIG. 20A, FIG. 20A is an exemplary first request for a musical record M.REQ.001, transmitted by the pairing device 110 to the remote server 120. The request for a musical record M.REQ.001 comprises: a first musical record identifier M.REC.ID.001, a digital musical recording identifier M.ID.001, a first musical pairing number MPN.001, a pointer to the musical record PTR.001, the address of the pairing device 110 PD.ADD as the sending address, and the address of the remote server 120 RS.ADD as the destination address.

Figure 20B:
FIG. 20B is a block diagram of an exemplary musical record transmission sent to the pairing from the remote server.

Referring now generally to the Figures, and particularly to FIG. 20B, FIG. 20B is an exemplary first transmission of a musical record M.REC.001 message M.XMIT.001 from the remote server 120 to the pairing device 110. The first transmission of a musical record M.REC.001 message M.XMIT.001 comprises: a musical record M.REC.001, a digital music recording M.001, a musical pairing number MPN.001, a pointer to the digital musical recording PTR.001, the address of the remote server 120 RS.ADD as the sending address, and the address of the pairing device 110 PD.ADD as the destination address.

The foregoing disclosures and statements are illustrative only of the Present Invention, and are not intended to limit or define the scope of the Present Invention. The above description is intended to be illustrative, and not restrictive. Although the examples given include many specificities, they are intended as illustrative of only certain possible configurations or aspects of the Present Invention. The examples given should only be interpreted as illustrations of some of the preferred configurations or aspects of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the present invention as disclosed and claimed should, therefore, be determined with reference to the knowledge of one skilled in the art and in light of the disclosures presented above.

I claim:

1. A computer-implemented method for associating musical records with specific foods comprising:
   a. accessing a digitally stored musical data record of a database having a plurality of digitally stored musical data records;
   b. determining a quality ranking value of the digitally stored musical data record, wherein the quality ranking value is at least partially derived from at least one of a tempo value determination, a musical genre determination, a primary musical instrument determination, and a musical dynamics determination;
   c. storing the quality ranking value in the digitally stored musical data record of the database;
   d. assigning a food ranking value to a food serving, wherein the food ranking value is at least partially derived from at least one of a protein type indication, a sauce richness indication, a cooking method identification, and a spice level indication;
   e. receiving a request to render one of the plurality of digitally stored musical data records;

f. determining if the quality ranking value of the digitally stored musical data record is equivalent to the food ranking value of the food serving, and if the quality ranking value is not equivalent to the food ranking value, then broadening the food ranking value and repeating step (f) until the food ranking value is equivalent to the quality ranking value; and g. audio rendering the musical data on a device when the quality ranking value of the digitally stored musical data record is equivalent to the food ranking value of the food serving.

2. The computer-implemented method of claim 1, wherein the quality ranking value of the digitally stored musical record is at least partially derived from the tempo value determination.

3. The computer-implemented method of claim 1, wherein the quality ranking value of the digitally stored musical record is at least partially derived from the musical genre determination.

4. The computer-implemented method of claim 1, wherein the quality ranking value of the digitally stored musical record is at least partially derived from the primary musical instrument determination.

5. The computer-implemented method of claim 1, wherein the quality ranking value of the digitally stored musical record is at least partially derived from the musical dynamics determination.

6. The computer-implemented method of claim 1, wherein the food ranking value of the food serving is at least partially derived from the protein type indication.

7. The computer-implemented method of claim 1, wherein the food ranking value of the food serving is at least partially derived from the sauce richness indication.

8. The computer-implemented method of claim 1, wherein the food ranking value of the food serving is at least partially derived from the cooking method identification.

9. The computer-implemented method of claim 1, wherein the food ranking value of the food serving is at least partially derived from the spice level indication.

10. The computer-implemented method of claim 9, wherein the spice level indication is at least partially derived from a saltiness level.

11. The computer-implemented method of claim 9, wherein the spice level indication is at least partially derived from a capsaicin concentration.

12. A computer-implemented method for associating musical records with specific foods comprising the steps of:
   accessing a digitally stored musical record of a database including a plurality of digitally stored musical records;
   b. receiving information for determining a food ranking value of a food serving and a quality ranking value of the digitally stored musical record, the information being input using one or more devices and the quality ranking value being stored electronically in the database, the digitally stored musical record including the quality ranking value;
   c. determining the quality ranking value by summing the information for determining the quality ranking value of the digitally stored music recording wherein the information for determining the quality ranking value comprises a plurality of musical values including at least one of a tempo value determination, a musical genre determination, a primary musical instrument determination, and a musical dynamics determination;
   d. determining the food ranking value by summing the information for determining the food ranking value, wherein the food ranking value comprises a plurality of food values including at least one of a protein type indication, a sauce richness indication, a cooking method identification, and a spice level indication;
   e. comparing the quality ranking value to the food ranking value, and if the quality ranking value does not substantively match the food ranking value, then broadening the food ranking value and repeating step (e) until the food ranking value substantively matches the quality ranking value; and
   f. rendering the digitally stored musical record on at least one of said one or more devices when the food ranking value substantively matches the quality ranking value.

13. The computer-implemented method of claim 12, wherein the food ranking value comprises at least one of a ranking value for an entrée, a ranking value for a dessert, and a ranking value for a beverage.

14. The computer-implemented method of claim 13, wherein the ranking value for the beverage is at least partially derived from a beverage parameter selected from the group of beverage parameters consisting of an alcohol content value, a wine type value, a hard alcohol/spirits value, a cocktail value, and a beer value, wherein one or more beverage parameters is a null value.

15. The computer-implemented method of claim 12, wherein the summation of the quality ranking value of the digitally stored musical record includes the tempo value determination.

16. The computer-implemented method of claim 12, wherein the summation of the quality ranking value of the digitally stored musical record includes the musical genre determination.

17. The computer-implemented method of claim 12, wherein the summation of the quality ranking value of the digitally stored musical record includes the primary musical instrument determination.

18. The computer-implemented method of claim 12, wherein the summation of the quality ranking value of the digitally stored musical record includes the musical dynamics determination.

19. The computer-implemented method of claim 12, wherein summation of the food ranking value of the food serving includes the protein type value indication.

20. The computer-implemented method of claim 12, wherein summation of the food ranking value of the food serving includes the sauce richness indication value.

21. The computer-implemented method of claim 12, wherein summation of the food ranking value of the food serving includes the cooking method identification value.

22. A computer system for associating musical records with specific foods, the system comprising:
   one or more processors;
   one or more memory devices;
   the memory device communicatively coupled with the processor and including machine-executable instructions that direct the computer system to interact with a user to instantiate the following aspects:
   a. access a digitally stored musical record of a database including a plurality of digitally stored musical records;
   b. receive information for determining a food ranking value of a food serving and a quality ranking value of a digitally stored musical record, the information being input using one or more devices and the quality ranking value being stored electronically within the database, the digitally stored musical record including the quality ranking value;
   c. determine the quality ranking value by summing the information for determining the quality ranking value of the digitally stored music recording wherein the information for determining the quality ranking value comprises a plurality of musical values including at least one of a tempo value determination, a musical genre determination, a primary musical instrument determination, and a musical dynamics determination;

d. determine the food ranking value by summing the information for determining the food ranking value, wherein the information for determining the food ranking value comprises a plurality of food values including at least one of a protein type value indication, a sauce richness indication value, a cooking method identification value, and a spice level indication value;

e. compare the quality ranking value to the food ranking value, and if the quality ranking value does not substantively match the food ranking value, then broadening the food ranking value and repeating step (d) until the food ranking value substantively matches the quality ranking value; and f. render the digitally stored musical record on at least one of said one or more devices when the food ranking value substantively matches the quality ranking value.

\* \* \* \* \*